United States Patent
Han et al.

(10) Patent No.: US 11,950,017 B2
(45) Date of Patent: Apr. 2, 2024

(54) REDUNDANT MOBILE VIDEO RECORDING

(71) Applicant: Digital Ally, Inc., Lenexa, KS (US)

(72) Inventors: Peng Han, Overland Park, KS (US); James W. Farnham, IV, Olathe, KS (US); Joshua L. Turner, Greenwood, MO (US); Douglas C. Fletcher, Lake Winnebago, MO (US)

(73) Assignee: Digital Ally, Inc., Lenexa, KS (US)

( * ) Notice: Subject to any disclaimer, the term of this patent is extended or adjusted under 35 U.S.C. 154(b) by 0 days.

(21) Appl. No.: 17/746,466

(22) Filed: May 17, 2022

(65) Prior Publication Data
US 2023/0379430 A1 Nov. 23, 2023

(51) Int. Cl.
| | |
|---|---|
| *H04N 5/77* | (2006.01) |
| *H04N 7/01* | (2006.01) |
| *H04N 7/18* | (2006.01) |
| *H04N 23/661* | (2023.01) |
| *H04N 23/667* | (2023.01) |
| *H04W 12/06* | (2021.01) |
| *H04W 12/63* | (2021.01) |

(52) U.S. Cl.
CPC ............. *H04N 5/77* (2013.01); *H04N 7/0117* (2013.01); *H04N 7/188* (2013.01); *H04N 23/661* (2023.01); *H04N 23/667* (2023.01); *H04W 12/06* (2013.01); *H04W 12/63* (2021.01)

(58) Field of Classification Search
CPC ........ H04N 5/77; H04N 7/0117; H04N 7/188; H04N 23/661; H04N 23/667; H04W 12/06; H04W 12/63
See application file for complete search history.

(56) References Cited

U.S. PATENT DOCUMENTS

| | | | |
|---|---|---|---|
| 4,409,670 A | 10/1983 | Herndon et al. | |
| 4,789,904 A | 12/1988 | Peterson | |
| 4,863,130 A | 9/1989 | Marks, Jr. | |
| 4,918,473 A | 4/1990 | Blackshear | |
| 5,027,104 A | 6/1991 | Reid | |

(Continued)

FOREIGN PATENT DOCUMENTS

| | | |
|---|---|---|
| DE | 102010019451 A1 | 11/2011 |
| EP | 2479993 A2 | 7/2012 |

(Continued)

OTHER PUBLICATIONS

Automation Systems Article, Know-How Bank Co. Ltd. Takes Leap Forward as a Company Specializing in R&D and Technology Consulting, published Jan. 2005.

(Continued)

*Primary Examiner* — Gevell V Selby
(74) *Attorney, Agent, or Firm* — Erise IP, P.A.

(57) ABSTRACT

Systems, methods, and computer-readable media are provided for redundantly storing and authenticating event related video data from one or more cameras using a video recording manager device. Additional copies of event related video data are persisted across various storage devices including any combination of internal camera storage, remote storage, and one or more storage mediums associated with the video recording manager device. The stored video data is augmented with authentication metadata to preserve the authenticity such that the video data is suitable as evidence.

20 Claims, 6 Drawing Sheets

(56) References Cited

U.S. PATENT DOCUMENTS

| | | |
|---|---|---|
| 5,064,157 A | 11/1991 | O'Neal |
| 5,096,287 A | 3/1992 | Kaikinami et al. |
| 5,111,289 A | 5/1992 | Lucas et al. |
| 5,289,321 A | 2/1994 | Secor |
| 5,381,155 A | 1/1995 | Gerber |
| 5,408,330 A | 4/1995 | Squicciarii et al. |
| 5,446,659 A | 8/1995 | Yamawaki |
| 5,453,939 A | 9/1995 | Hoffman et al. |
| 5,473,501 A | 12/1995 | Claypool |
| 5,473,729 A | 12/1995 | Bryant et al. |
| 5,479,149 A | 12/1995 | Pike |
| 5,497,419 A | 3/1996 | Hill |
| 5,526,133 A | 6/1996 | Paff |
| 5,585,798 A | 12/1996 | Yoshioka et al. |
| 5,642,285 A | 6/1997 | Woo et al. |
| 5,668,675 A | 9/1997 | Fredricks |
| 5,689,442 A | 11/1997 | Swanson et al. |
| 5,742,336 A | 4/1998 | Lee |
| 5,752,632 A | 5/1998 | Sanderson et al. |
| 5,798,458 A | 8/1998 | Monroe |
| 5,815,093 A | 9/1998 | Kikinis |
| 5,850,613 A | 12/1998 | Bullecks |
| 5,878,283 A | 3/1999 | House et al. |
| 5,886,739 A | 3/1999 | Winningstad |
| 5,890,079 A | 3/1999 | Levine |
| 5,926,210 A | 7/1999 | Hackett et al. |
| 5,962,806 A | 10/1999 | Coakley et al. |
| 5,978,017 A | 11/1999 | Tino |
| 5,983,161 A | 11/1999 | Lemelson et al. |
| 5,996,023 A | 11/1999 | Winter et al. |
| 6,008,841 A | 12/1999 | Charlson |
| 6,028,528 A | 2/2000 | Lorenzetti et al. |
| 6,052,068 A | 4/2000 | Price R-W et al. |
| 6,097,429 A | 8/2000 | Seeley et al. |
| 6,100,806 A | 8/2000 | Gaukel |
| 6,121,881 A | 9/2000 | Bieback et al. |
| 6,141,609 A | 10/2000 | Herdeg et al. |
| 6,141,611 A | 10/2000 | Mackey et al. |
| 6,163,338 A | 12/2000 | Johnson et al. |
| 6,175,300 B1 | 1/2001 | Kendrick |
| 6,298,290 B1 | 10/2001 | Abe et al. |
| 6,310,541 B1 | 10/2001 | Atkins |
| 6,314,364 B1 | 11/2001 | Nakamura |
| 6,324,053 B1 | 11/2001 | Kamijo |
| 6,326,900 B2 | 12/2001 | Deline et al. |
| 6,333,694 B2 | 12/2001 | Pierce et al. |
| 6,333,759 B1 | 12/2001 | Mazzilli |
| 6,370,475 B1 | 4/2002 | Breed et al. |
| RE37,709 E | 5/2002 | Dukek |
| 6,389,340 B1 | 5/2002 | Rayner |
| 6,396,403 B1 | 5/2002 | Haner |
| 6,405,112 B1 | 6/2002 | Rayner |
| 6,449,540 B1 | 9/2002 | Rayner |
| 6,452,572 B1 | 9/2002 | Fan et al. |
| 6,490,409 B1 | 12/2002 | Walker |
| 6,518,881 B2 | 2/2003 | Monroe |
| 6,525,672 B2 | 2/2003 | Chainer et al. |
| 6,546,119 B2 | 4/2003 | Ciolli et al. |
| 6,560,463 B1 | 5/2003 | Santhoff |
| 6,563,532 B1 | 5/2003 | Strub et al. |
| 6,583,813 B1 | 7/2003 | Enright et al. |
| 6,591,242 B1 | 7/2003 | Karp et al. |
| 6,681,195 B1 | 1/2004 | Poland et al. |
| 6,690,268 B2 | 2/2004 | Schofield et al. |
| 6,697,103 B1 | 2/2004 | Fernandez et al. |
| 6,718,239 B2 | 4/2004 | Rayer |
| 6,727,816 B1 | 4/2004 | Helgeson |
| 6,747,687 B1 | 6/2004 | Alves |
| 6,748,792 B1 | 6/2004 | Freund et al. |
| 6,783,040 B2 | 8/2004 | Batchelor |
| 6,823,621 B2 | 11/2004 | Gotfried |
| 6,831,556 B1 | 12/2004 | Boykin |
| 6,856,873 B2 | 2/2005 | Breed et al. |
| 6,877,434 B1 | 4/2005 | NcNulty, Jr. |
| 6,883,694 B2 | 4/2005 | Abelow |
| 6,894,601 B1 | 5/2005 | Grunden et al. |
| 6,947,071 B2 | 9/2005 | Eichmann |
| 6,970,183 B1 | 11/2005 | Monroe |
| 7,012,632 B2 | 3/2006 | Freeman et al. |
| 7,034,683 B2 | 4/2006 | Ghazarian |
| D520,738 S | 5/2006 | Tarantino |
| 7,038,590 B2 | 5/2006 | Hoffman et al. |
| 7,071,969 B1 | 7/2006 | Stimson, III |
| 7,088,387 B1 | 8/2006 | Freeman et al. |
| 7,102,496 B1 | 9/2006 | Ernst et al. |
| 7,119,832 B2 | 10/2006 | Blanco et al. |
| 7,126,472 B2 | 10/2006 | Kraus et al. |
| 7,147,155 B2 | 12/2006 | Weekes |
| 7,180,407 B1 | 2/2007 | Guo et al. |
| 7,190,822 B2 | 3/2007 | Gammenthaler |
| 7,350,437 B2 | 4/2008 | Mangano et al. |
| 7,353,086 B2 | 4/2008 | Ennis |
| 7,363,742 B2 | 4/2008 | Nerheim |
| 7,371,021 B2 | 5/2008 | Ross et al. |
| 7,421,024 B2 | 9/2008 | Castillo |
| 7,436,143 B2 | 10/2008 | Lakshmanan et al. |
| 7,436,955 B2 | 10/2008 | Yan et al. |
| 7,448,996 B2 | 11/2008 | Khanuja et al. |
| 7,456,875 B2 | 11/2008 | Kashiwa |
| 7,496,140 B2 | 2/2009 | Winningstad et al. |
| 7,500,794 B1 | 3/2009 | Clark |
| 7,508,941 B1 | 3/2009 | O'Toole, Jr. et al. |
| 7,536,457 B2 | 5/2009 | Miller |
| 7,539,533 B2 | 5/2009 | Tran |
| 7,561,037 B1 | 7/2009 | Monroe |
| 7,594,305 B2 | 9/2009 | Moore |
| 7,602,301 B1 | 10/2009 | Stirling et al. |
| 7,602,597 B2 | 10/2009 | Smith et al. |
| 7,631,452 B1 | 12/2009 | Brundula et al. |
| 7,656,439 B1 | 2/2010 | Manico et al. |
| 7,659,827 B2 | 2/2010 | Gunderson et al. |
| 7,680,947 B2 | 3/2010 | Nicholl et al. |
| 7,697,035 B1 | 4/2010 | Suber, III et al. |
| 7,701,692 B2 | 4/2010 | Smith et al. |
| 7,714,704 B1 | 5/2010 | Mellen |
| 7,778,004 B2 | 8/2010 | Nerheim et al. |
| 7,804,426 B2 | 9/2010 | Etcheson |
| 7,806,525 B2 | 10/2010 | Howell et al. |
| 7,853,944 B2 | 12/2010 | Choe |
| 7,944,676 B2 | 5/2011 | Smith et al. |
| 7,984,579 B2 | 7/2011 | Brundula et al. |
| 8,077,029 B1 | 12/2011 | Daniel et al. |
| 8,121,306 B2 | 2/2012 | Cilia et al. |
| 8,175,314 B1 | 5/2012 | Webster |
| 8,269,617 B2 | 9/2012 | Cook et al. |
| 8,314,708 B2 | 11/2012 | Gunderson et al. |
| 8,350,907 B1 | 1/2013 | Blanco et al. |
| 8,356,438 B2 | 1/2013 | Brundula et al. |
| 8,373,567 B2 | 2/2013 | Denson |
| 8,373,797 B2 | 2/2013 | Ishii et al. |
| 8,384,539 B2 | 2/2013 | Denny et al. |
| 8,446,469 B2 | 5/2013 | Blanco et al. |
| 8,456,293 B1 | 6/2013 | Trundle et al. |
| 8,508,353 B2 | 8/2013 | Cook et al. |
| 8,559,486 B2 | 10/2013 | Kitayoshi |
| 8,594,485 B2 | 11/2013 | Brundula |
| 8,606,492 B1 | 12/2013 | Botnen |
| 8,676,428 B2 | 3/2014 | Richardson et al. |
| 8,690,365 B1 | 4/2014 | Williams |
| 8,707,758 B2 | 4/2014 | Keays |
| 8,725,462 B2 | 5/2014 | Jain et al. |
| 8,744,642 B2 | 6/2014 | Nemat-Nasser et al. |
| 8,780,205 B2 | 7/2014 | Boutell et al. |
| 8,781,292 B1 | 7/2014 | Ross et al. |
| 8,805,431 B2 | 8/2014 | Vasavada et al. |
| 8,849,501 B2 | 9/2014 | Cook et al. |
| 8,854,199 B2 | 10/2014 | Cook et al. |
| 8,887,208 B1 | 11/2014 | Merrit et al. |
| 8,890,954 B2 | 11/2014 | O'Donnell et al. |
| 8,903,593 B1 | 12/2014 | Addepalli et al. |
| 8,930,072 B1 | 1/2015 | Lambert et al. |
| 8,934,045 B2 | 1/2015 | Karn et al. |
| 8,989,914 B1 | 3/2015 | Nemat-Nasser et al. |
| 8,996,234 B1 | 3/2015 | Tamari et al. |

(56) References Cited

U.S. PATENT DOCUMENTS

| | | |
|---|---|---|
| 8,996,240 B2 | 3/2015 | Plante |
| 9,002,313 B2 | 4/2015 | Sink et al. |
| 9,003,474 B1 | 4/2015 | Smith |
| 9,058,499 B1 | 6/2015 | Smith |
| 9,122,082 B2 | 9/2015 | Abreau |
| 9,123,241 B2 | 9/2015 | Grigsby et al. |
| 9,159,371 B2 | 10/2015 | Ross et al. |
| 9,164,543 B2 | 10/2015 | Minn et al. |
| 9,253,452 B2 | 2/2016 | Ross et al. |
| 9,518,727 B1 | 12/2016 | Markle et al. |
| 9,582,979 B2 | 2/2017 | Mader et al. |
| 9,591,255 B2 | 3/2017 | Skiewica et al. |
| 9,728,228 B2 | 8/2017 | Palmer et al. |
| 9,774,816 B2 | 9/2017 | Rios, III et al. |
| 9,781,348 B1 | 10/2017 | Bart et al. |
| 10,271,015 B2 | 4/2019 | Haler et al. |
| 10,964,351 B2 | 3/2021 | Ross et al. |
| 11,232,685 B1 * | 1/2022 | Nixon .................... H04N 23/60 |
| 2001/0033661 A1 | 10/2001 | Prokoski |
| 2002/0013517 A1 | 1/2002 | West et al. |
| 2002/0019696 A1 | 2/2002 | Kruse |
| 2002/0032510 A1 | 3/2002 | Tumball et al. |
| 2002/0044065 A1 | 4/2002 | Quist et al. |
| 2002/0049881 A1 | 4/2002 | Sugimura |
| 2002/0077086 A1 | 7/2002 | Tuomela et al. |
| 2002/0084130 A1 | 7/2002 | Der Gazarian et al. |
| 2002/0131768 A1 | 9/2002 | Gammenthaler |
| 2002/0135336 A1 | 9/2002 | Zhou et al. |
| 2002/0159434 A1 | 10/2002 | Gosior et al. |
| 2002/0191952 A1 | 12/2002 | Fiore et al. |
| 2003/0040917 A1 | 2/2003 | Fiedler |
| 2003/0080713 A1 | 5/2003 | Kirmuss |
| 2003/0080878 A1 | 5/2003 | Kirmuss |
| 2003/0081121 A1 | 5/2003 | Kirmuss |
| 2003/0081934 A1 | 5/2003 | Kirmuss |
| 2003/0081935 A1 | 5/2003 | Kirmuss |
| 2003/0081942 A1 | 5/2003 | Melnyk et al. |
| 2003/0095688 A1 | 5/2003 | Kirmuss |
| 2003/0106917 A1 | 6/2003 | Shelter et al. |
| 2003/0133018 A1 | 7/2003 | Ziemkowski |
| 2003/0151510 A1 | 8/2003 | Quintana et al. |
| 2003/0184674 A1 | 10/2003 | Manico et al. |
| 2003/0185417 A1 | 10/2003 | Alattar et al. |
| 2003/0215010 A1 | 11/2003 | Kashiwa |
| 2003/0215114 A1 | 11/2003 | Kyle |
| 2003/0222982 A1 | 12/2003 | Hamdan et al. |
| 2003/0229493 A1 | 12/2003 | McIntyre et al. |
| 2004/0008255 A1 | 1/2004 | Lewellen |
| 2004/0043765 A1 | 3/2004 | Tolhurst |
| 2004/0143373 A1 | 6/2004 | Ennis |
| 2004/0131184 A1 | 7/2004 | Wu et al. |
| 2004/0141059 A1 | 7/2004 | Enright et al. |
| 2004/0145457 A1 | 7/2004 | Schofield et al. |
| 2004/0150717 A1 | 8/2004 | Page et al. |
| 2004/0168002 A1 | 8/2004 | Accarie et al. |
| 2004/0199785 A1 | 10/2004 | Pederson |
| 2004/0223054 A1 | 11/2004 | Rotholtz |
| 2004/0243734 A1 | 12/2004 | Kitagawa et al. |
| 2004/0267419 A1 | 12/2004 | Jing |
| 2005/0030151 A1 | 2/2005 | Singh |
| 2005/0046583 A1 | 3/2005 | Richards |
| 2005/0050266 A1 | 3/2005 | Haas et al. |
| 2005/0068169 A1 | 3/2005 | Copley et al. |
| 2005/0068417 A1 | 3/2005 | Kreiner et al. |
| 2005/0083404 A1 | 4/2005 | Pierce et al. |
| 2005/0094966 A1 | 5/2005 | Elberbaum |
| 2005/0099498 A1 | 5/2005 | Lao et al. |
| 2005/0100329 A1 | 5/2005 | Lao et al. |
| 2005/0101334 A1 | 5/2005 | Brown et al. |
| 2005/0134966 A1 | 5/2005 | Burgner |
| 2005/0132200 A1 | 6/2005 | Jaffe et al. |
| 2005/0151852 A1 | 7/2005 | Jomppanen |
| 2005/0035161 A1 | 8/2005 | Shioda |
| 2005/0168574 A1 | 8/2005 | Lipton et al. |
| 2005/0185438 A1 | 8/2005 | Ching |
| 2005/0206532 A1 | 9/2005 | Lock |
| 2005/0206741 A1 | 9/2005 | Raber |
| 2005/0228234 A1 | 10/2005 | Yang |
| 2005/0232469 A1 | 10/2005 | Schofield et al. |
| 2005/0243171 A1 | 11/2005 | Ross et al. |
| 2005/0258942 A1 | 11/2005 | Manasseh et al. |
| 2006/0009238 A1 | 1/2006 | Stanco et al. |
| 2006/0028811 A1 | 2/2006 | Ross, Jr. et al. |
| 2006/0055786 A1 | 3/2006 | Olilla |
| 2006/0082730 A1 | 4/2006 | Franks |
| 2006/0125919 A1 | 7/2006 | Camilleri et al. |
| 2006/0153740 A1 | 7/2006 | Sultan et al. |
| 2006/0158968 A1 | 7/2006 | Vanman et al. |
| 2006/0164220 A1 | 7/2006 | Harter, Jr. et al. |
| 2006/0164534 A1 | 7/2006 | Robinson et al. |
| 2006/0170770 A1 | 8/2006 | MacCarthy |
| 2006/0176149 A1 | 8/2006 | Douglas |
| 2006/0183505 A1 | 8/2006 | Willrich |
| 2006/0193749 A1 | 8/2006 | Ghazarian et al. |
| 2006/0203090 A1 | 9/2006 | Wang et al. |
| 2006/0208857 A1 | 10/2006 | Wong |
| 2006/0220826 A1 | 10/2006 | Rast |
| 2006/0225253 A1 | 10/2006 | Bates |
| 2006/0232406 A1 | 10/2006 | Filibeck |
| 2006/0244601 A1 | 11/2006 | Nishimura |
| 2006/0256822 A1 | 11/2006 | Kwong et al. |
| 2006/0270465 A1 | 11/2006 | Lee et al. |
| 2006/0271287 A1 | 11/2006 | Gold et al. |
| 2006/0274166 A1 | 12/2006 | Lee et al. |
| 2006/0274828 A1 | 12/2006 | Siemens et al. |
| 2006/0274829 A1 | 12/2006 | Siemens et al. |
| 2006/0276200 A1 | 12/2006 | Radhakrishnan et al. |
| 2006/0282021 A1 | 12/2006 | DeVaul et al. |
| 2006/0287821 A1 | 12/2006 | Lin |
| 2006/0293571 A1 | 12/2006 | Bao et al. |
| 2007/0021134 A1 | 1/2007 | Liou |
| 2007/0035622 A1 | 2/2007 | Hanna et al. |
| 2007/0064108 A1 | 3/2007 | Haler |
| 2007/0067079 A1 | 3/2007 | Kosugi |
| 2007/0081818 A1 | 4/2007 | Castaneda et al. |
| 2007/0091557 A1 | 4/2007 | Kim et al. |
| 2007/0102508 A1 | 5/2007 | Mcintosh |
| 2007/0117083 A1 | 5/2007 | Winneg et al. |
| 2007/0132567 A1 | 6/2007 | Schofield et al. |
| 2007/0152811 A1 | 7/2007 | Anderson |
| 2007/0172053 A1 | 7/2007 | Poirier |
| 2007/0177023 A1 | 8/2007 | Beuhler et al. |
| 2007/0195939 A1 | 8/2007 | Sink et al. |
| 2007/0199076 A1 | 8/2007 | Rensin et al. |
| 2007/0213088 A1 | 9/2007 | Sink |
| 2007/0229350 A1 | 10/2007 | Scalisi et al. |
| 2007/0257781 A1 | 11/2007 | Denson |
| 2007/0257782 A1 | 11/2007 | Etcheson |
| 2007/0257804 A1 | 11/2007 | Gunderson et al. |
| 2007/0257815 A1 | 11/2007 | Gunderson et al. |
| 2007/0260361 A1 | 11/2007 | Etcheson |
| 2007/0268158 A1 | 11/2007 | Gunderson et al. |
| 2007/0271105 A1 | 11/2007 | Gunderson et al. |
| 2007/0274705 A1 | 11/2007 | Kashiwa |
| 2007/0277352 A1 | 12/2007 | Maron et al. |
| 2007/0285222 A1 | 12/2007 | Zadnikar |
| 2007/0287425 A1 | 12/2007 | Bates |
| 2007/0297320 A1 | 12/2007 | Brummette et al. |
| 2008/0001735 A1 | 1/2008 | Tran |
| 2008/0002031 A1 | 1/2008 | Cana et al. |
| 2008/0002599 A1 | 2/2008 | Denny et al. |
| 2008/0030580 A1 | 2/2008 | Kashhiawa et al. |
| 2008/0042825 A1 | 2/2008 | Denny et al. |
| 2008/0043736 A1 | 2/2008 | Stanley |
| 2008/0049830 A1 | 2/2008 | Richardson |
| 2008/0061991 A1 | 3/2008 | Urban et al. |
| 2008/0063252 A1 | 3/2008 | Dobbs et al. |
| 2008/0084473 A1 | 4/2008 | Romanowich |
| 2008/0100705 A1 | 5/2008 | Kister et al. |
| 2008/0101789 A1 | 5/2008 | Sharma |
| 2008/0122603 A1 | 5/2008 | Piante et al. |
| 2008/0129518 A1 | 6/2008 | Carlton-Foss |
| 2008/0143481 A1 | 6/2008 | Abraham et al. |
| 2008/0144705 A1 | 6/2008 | Rackin et al. |

(56) References Cited

U.S. PATENT DOCUMENTS

| | | |
|---|---|---|
| 2008/0169929 A1 | 7/2008 | Albertson et al. |
| 2008/0170130 A1 | 7/2008 | Ollila et al. |
| 2008/0175565 A1 | 7/2008 | Takakura et al. |
| 2008/0177569 A1 | 7/2008 | Chen et al. |
| 2008/0211906 A1 | 9/2008 | Lovric |
| 2008/0222849 A1 | 9/2008 | Lavoie |
| 2008/0239064 A1 | 10/2008 | Iwasaki |
| 2008/0246656 A1 | 10/2008 | Ghazarian |
| 2008/0266118 A1 | 10/2008 | Pierson et al. |
| 2008/0307435 A1 | 12/2008 | Rehman |
| 2008/0316314 A1 | 12/2008 | Bedell et al. |
| 2009/0002491 A1 | 1/2009 | Haler |
| 2009/0002556 A1 | 1/2009 | Manapragada et al. |
| 2009/0023422 A1 | 1/2009 | MacInnis et al. |
| 2009/0027499 A1 | 1/2009 | Nicholl |
| 2009/0052685 A1 | 2/2009 | Cilia et al. |
| 2009/0070820 A1 | 3/2009 | Li |
| 2009/0085740 A1 | 4/2009 | Klein et al. |
| 2009/0109292 A1 | 4/2009 | Ennis |
| 2009/0122142 A1 | 5/2009 | Shapley |
| 2009/0135007 A1 | 5/2009 | Donovan et al. |
| 2009/0177679 A1 | 6/2009 | Boomer et al. |
| 2009/0157255 A1 | 7/2009 | Plante |
| 2009/0169068 A1 | 7/2009 | Okamoto |
| 2009/0189981 A1 | 7/2009 | Siann et al. |
| 2009/0195686 A1 | 8/2009 | Shintani |
| 2009/0207252 A1 | 8/2009 | Raghunath |
| 2009/0213204 A1 | 8/2009 | Wong |
| 2009/0225189 A1 | 9/2009 | Morin |
| 2009/0243794 A1 | 10/2009 | Morrow |
| 2009/0251545 A1 | 10/2009 | Shekarri et al. |
| 2009/0252370 A1 | 10/2009 | Picard et al. |
| 2009/0252486 A1 | 10/2009 | Ross, Jr. et al. |
| 2009/0276708 A1 | 11/2009 | Smith et al. |
| 2009/0294538 A1 | 12/2009 | Wihlborg et al. |
| 2009/0324203 A1 | 12/2009 | Wiklof |
| 2010/0045798 A1 | 2/2010 | Sugimoto et al. |
| 2010/0050734 A1 | 3/2010 | Chou |
| 2010/0060747 A1 | 3/2010 | Woodman |
| 2010/0097221 A1 | 4/2010 | Kriener et al. |
| 2010/0106707 A1 | 4/2010 | Brown et al. |
| 2010/0118147 A1 | 5/2010 | Dorneich et al. |
| 2010/0122435 A1 | 5/2010 | Markham |
| 2010/0123779 A1 | 5/2010 | Snyder et al. |
| 2010/0157049 A1 | 6/2010 | Dvir et al. |
| 2010/0177193 A1 | 7/2010 | Flores |
| 2010/0177891 A1 | 7/2010 | Keidar et al. |
| 2010/0188201 A1 | 7/2010 | Cook et al. |
| 2010/0191411 A1 | 7/2010 | Cook et al. |
| 2010/0194885 A1 | 8/2010 | Plaster |
| 2010/0217836 A1 | 8/2010 | Rofougaran |
| 2010/0238009 A1 | 9/2010 | Cook et al. |
| 2010/0238262 A1 | 9/2010 | Kurtz et al. |
| 2010/0242076 A1 | 9/2010 | Potesta et al. |
| 2010/0265331 A1 | 10/2010 | Tanaka |
| 2010/0274816 A1 | 10/2010 | Guzik |
| 2010/0287473 A1 | 11/2010 | Recesso et al. |
| 2011/0006151 A1 | 1/2011 | Beard |
| 2011/0018998 A1 | 1/2011 | Guzik |
| 2011/0050904 A1 | 3/2011 | Anderson |
| 2011/0069151 A1 | 3/2011 | Orimoto |
| 2011/0084820 A1 | 4/2011 | Walter et al. |
| 2011/0094003 A1 | 4/2011 | Spiewak et al. |
| 2011/0098924 A1 | 4/2011 | Baladeta et al. |
| 2011/0129151 A1 | 6/2011 | Saito et al. |
| 2011/0157759 A1 | 6/2011 | Smith et al. |
| 2011/0187895 A1 | 8/2011 | Cheng et al. |
| 2011/0261176 A1 | 10/2011 | Monaghan, Sr. et al. |
| 2011/0281547 A1 | 11/2011 | Cordero |
| 2011/0301971 A1 | 12/2011 | Roesch et al. |
| 2011/0314401 A1 | 12/2011 | Salisbury et al. |
| 2012/0038689 A1 | 2/2012 | Ishii |
| 2012/0056722 A1 | 3/2012 | Kawaguchi |
| 2012/0063736 A1 | 3/2012 | Simmons et al. |
| 2012/0120258 A1 | 5/2012 | Boutell et al. |
| 2012/0162436 A1 | 6/2012 | Cordell et al. |
| 2012/0188345 A1 | 7/2012 | Salow |
| 2012/0189286 A1 | 7/2012 | Takayama et al. |
| 2012/0195574 A1 | 8/2012 | Wallace |
| 2012/0206565 A1 | 8/2012 | Villmer |
| 2012/0230540 A1 | 9/2012 | Calman et al. |
| 2012/0257320 A1 | 10/2012 | Brundula et al. |
| 2012/0268259 A1 | 10/2012 | Igel et al. |
| 2012/0276954 A1 | 11/2012 | Kowalsky |
| 2012/0314063 A1 | 12/2012 | Cirker |
| 2013/0021153 A1 | 1/2013 | Keays |
| 2013/0033610 A1 | 2/2013 | Osborn |
| 2013/0035602 A1 | 2/2013 | Gemer |
| 2013/0080836 A1 | 3/2013 | Stergiou et al. |
| 2013/0095855 A1 | 4/2013 | Bort |
| 2013/0096731 A1 | 4/2013 | Tamari et al. |
| 2013/0125000 A1 | 5/2013 | Fliscnhauser et al. |
| 2013/0148295 A1 | 6/2013 | Minn et al. |
| 2013/0222640 A1 | 8/2013 | Baek et al. |
| 2013/0225309 A1 | 8/2013 | Bentley et al. |
| 2013/0265453 A1 | 10/2013 | Middleton et al. |
| 2013/0285232 A1 | 10/2013 | Sheth |
| 2013/0290018 A1 | 10/2013 | Anderson et al. |
| 2013/0300563 A1 | 11/2013 | Glaze |
| 2013/0329063 A1 | 12/2013 | Zhou |
| 2013/0343571 A1 | 12/2013 | Lee |
| 2014/0037262 A1 | 2/2014 | Sako |
| 2014/0040158 A1 | 2/2014 | Dalley, Jr. et al. |
| 2014/0049636 A1 | 2/2014 | O'Donnell et al. |
| 2014/0092299 A1 | 4/2014 | Phillips et al. |
| 2014/0094992 A1 | 4/2014 | Lambert et al. |
| 2014/0098453 A1 | 4/2014 | Brundula et al. |
| 2014/0131435 A1 | 5/2014 | Harrington et al. |
| 2014/0139680 A1 | 5/2014 | Huang et al. |
| 2014/0140575 A1 | 5/2014 | Wolf |
| 2014/0143545 A1 | 5/2014 | McKeeman et al. |
| 2014/0167954 A1 | 6/2014 | Johnson et al. |
| 2014/0170602 A1 | 6/2014 | Reed |
| 2014/0176733 A1 | 6/2014 | Drooker et al. |
| 2014/0178031 A1 | 6/2014 | Walker |
| 2014/0192194 A1 | 7/2014 | Bedell et al. |
| 2014/0195105 A1 | 7/2014 | Lambert et al. |
| 2014/0195272 A1 | 7/2014 | Sadiq et al. |
| 2014/0210625 A1 | 7/2014 | Nemat-Nasser |
| 2014/0218544 A1 | 8/2014 | Senot et al. |
| 2014/0227671 A1 | 8/2014 | Olmstead et al. |
| 2014/0311215 A1 | 10/2014 | Keays et al. |
| 2014/0341532 A1 | 11/2014 | Marathe et al. |
| 2014/0355951 A1 | 12/2014 | Tabak |
| 2014/0368658 A1 | 12/2014 | Costa et al. |
| 2015/0019982 A1 | 1/2015 | Petitt, Jr. et al. |
| 2015/0050003 A1 | 2/2015 | Ross et al. |
| 2015/0051502 A1 | 2/2015 | Ross |
| 2015/0053776 A1 | 3/2015 | Rose et al. |
| 2015/0078727 A1 | 3/2015 | Ross et al. |
| 2015/0088335 A1 | 3/2015 | Lambert et al. |
| 2015/0103246 A1 | 4/2015 | Phillips et al. |
| 2015/0163390 A1 | 6/2015 | Lee et al. |
| 2015/0180746 A1 | 6/2015 | Day et al. |
| 2015/0229630 A1 | 8/2015 | Smith |
| 2015/0256808 A1 | 9/2015 | MacMillan et al. |
| 2015/0312773 A1 | 10/2015 | Joshi et al. |
| 2015/0317368 A1 | 11/2015 | Rhoads et al. |
| 2015/0332424 A1 | 11/2015 | Kane et al. |
| 2015/0348417 A1 | 12/2015 | Ignaczak et al. |
| 2015/0356081 A1 | 12/2015 | Cronin |
| 2015/0358549 A1 | 12/2015 | Cho et al. |
| 2016/0006922 A1* | 1/2016 | Boudreau ............ H04N 23/634 348/207.1 |
| 2016/0042767 A1 | 2/2016 | Araya et al. |
| 2016/0050345 A1 | 2/2016 | Longbotham |
| 2016/0054735 A1 | 2/2016 | Switkes et al. |
| 2016/0057392 A1 | 2/2016 | Meidan et al. |
| 2016/0064036 A1 | 3/2016 | Chen et al. |
| 2016/0066085 A1 | 3/2016 | Chang et al. |
| 2016/0104508 A1 | 4/2016 | Chee et al. |
| 2016/0112636 A1 | 4/2016 | Yamaguchi et al. |
| 2016/0127695 A1 | 5/2016 | Zhang et al. |
| 2016/0165192 A1 | 6/2016 | Saatchi et al. |

(56) References Cited

U.S. PATENT DOCUMENTS

| | | | |
|---|---|---|---|
| 2016/0295089 A1 | 10/2016 | Farahani | |
| 2016/0358393 A1 | 12/2016 | Penland | |
| 2016/0360160 A1 | 12/2016 | Eizenberg | |
| 2016/0364621 A1 | 12/2016 | Hill et al. | |
| 2017/0028935 A1 | 2/2017 | Dutta et al. | |
| 2017/0059265 A1* | 3/2017 | Winter | H04N 23/51 |
| 2017/0070659 A1 | 3/2017 | Kievsky et al. | |
| 2017/0161382 A1 | 6/2017 | Ouimet et al. | |
| 2017/0178475 A1 | 6/2017 | Renkis | |
| 2017/0195635 A1 | 7/2017 | Yokomitsu et al. | |
| 2017/0200476 A1 | 7/2017 | Chen et al. | |
| 2017/0230605 A1 | 8/2017 | Han et al. | |
| 2017/0237950 A1 | 8/2017 | Araya et al. | |
| 2017/0244884 A1 | 8/2017 | Burtey et al. | |
| 2017/0277700 A1 | 9/2017 | Davis et al. | |
| 2017/0287523 A1 | 10/2017 | Hodulik et al. | |
| 2018/0023910 A1 | 1/2018 | Kramer | |
| 2018/0050800 A1 | 2/2018 | Boykin et al. | |
| 2018/0053394 A1 | 2/2018 | Gersten | |
| 2018/0131844 A1 | 5/2018 | Lau | |
| 2018/0262724 A1* | 9/2018 | Ross | H04N 7/188 |
| 2019/0020827 A1* | 1/2019 | Siminoff | H04N 23/651 |
| 2019/0057314 A1* | 2/2019 | Julian | H04L 67/34 |

FOREIGN PATENT DOCUMENTS

| | | |
|---|---|---|
| EP | 3073449 A1 | 9/2016 |
| GB | 2273624 | 6/1994 |
| GB | 2320389 | 5/1998 |
| GB | 2343252 | 5/2000 |
| GB | 2351055 | 12/2000 |
| GB | 2417151 | 2/2006 |
| GB | 2425427 | 10/2006 |
| GB | 2455885 | 7/2009 |
| GB | 2485804 A | 5/2012 |
| IE | 20090923 A1 | 9/2010 |
| JP | 294188 | 9/1993 |
| JP | 153298 | 6/1996 |
| JP | 198858 | 7/1997 |
| JP | 10076880 A | 3/1998 |
| JP | 210395 | 7/1998 |
| JP | 2000137263 A | 5/2000 |
| JP | 2005119631 A | 5/2005 |
| KR | 20-0236817 | 8/2001 |
| KR | 1050897 | 7/2011 |
| RU | 2383915 C2 | 3/2010 |
| RU | 107851 U1 | 8/2011 |
| RU | 124780 U1 | 2/2013 |
| WO | 9005076 | 5/1990 |
| WO | 9738526 | 10/1997 |
| WO | 9831146 | 7/1998 |
| WO | 9948308 | 9/1999 |
| WO | 0039556 | 7/2000 |
| WO | 0051360 | 8/2000 |
| WO | 0123214 A1 | 4/2001 |
| WO | 0249881 | 6/2002 |
| WO | 02095757 | 11/2002 |
| WO | 03049446 | 6/2003 |
| WO | 2004036926 A2 | 4/2004 |
| WO | 2009013526 A1 | 1/2009 |
| WO | 2011001180 A1 | 1/2011 |
| WO | 2012037139 A2 | 3/2012 |
| WO | 2012120083 A1 | 9/2012 |
| WO | 2014000161 A1 | 1/2014 |
| WO | 2014052898 A1 | 4/2014 |

OTHER PUBLICATIONS

Car Rear View Camera—Multimedia Rear View Mirror—4' LCD color monitor, Retrieved from the Internet: <URL: http://web.archive.org/web/20050209014751/http://laipac.com/multimedia-rear-mirror.htm>, Feb. 9, 2005.

ATC Chameleon. Techdad Review [Online] Jun. 19, 2013 [Retrieved on Dec. 30, 2015]. Retrieved from Internet. <URL:http://www.techdadreview.com/2013/06/19atc-chameleon/>.

"Breathalyzer." Wikipedia. Printed Date: Oct. 16, 2014; Date Page Last Modified: Sep. 14, 2014; <http://en.wikipedia.org/wiki/Breathalyzer>.

Dees, Tim; Taser Axon Flex: The next generation of body camera; <http://www.policeone.com/police-products/body-cameras/articles/527231-0-TASER-Axon-Flex-The-next-generation-of-body-camera/>, Date Posted: Mar. 12, 2012; Date Printed: Oct. 27, 2015.

Brown, TP-Link TL-WDR3500 Wireless N600 Router Review, Mar. 6, 2013.

Controller Area Network (CAN) Overview, National Instruments White Paper, Aug. 1, 2014.

Daskam, Samuel W., Law Enforcement Armed Robbery Alarm System Utilizing Recorded Voice Addresses via Police Radio Channels, Source: Univ. of Ky, Off of Res and Eng., Serv (UKY BU107), pp. 18-22, 1975.

*Digital Ally* vs. *Taser International, Inc.*, Case No. 2:16-cv-232 (CJM/TJ); US D. Kan, Defendant Taser International Inc.'s Preliminary Invalidity Contentions, Jul. 5, 2016.

Electronic Times Article, published Feb. 24, 2005.

Supplementary European Search Report dated Sep. 28, 2010 in European Patent Application No. 06803645.8; Applicant: Digital Ally, Inc.

W. Fincham, Data Recorders for Accident Investigation, Monitoring of Driver and Vehicle Performance (Digest No. 1997/122), Publication Date: Apr. 10, 1997, pp. 6/1-6/3.

Frankel, Harry; Riter, Stephen, Bernat, Andrew, Automated Imaging System for Border Control, Source: University of Kentucky, Office of Engineering Services, (Bulletin) UKY BU, pp. 169-173, Aug. 1986.

Freudenrich, Craig, Ph.D.; "How Breathalyzers Work—Why Test?." HowStuffWorks. Printed Date: Oct. 16, 2014; Posted Date: Unknown; <http://electronics.howstuffworks.com/gadgets/automotive/breathalyzer1.htm>.

Hankyung Auto News Article, Know-How Bank's Black Box for Cars "Multi-Black Box," Copyright 2005.

Guide to Bluetooth Security: Recommendations of the National Institute of Standards and Technology, National Institute of Standards and Technology, U.S. Dep't of Commerce, NIST Special Publication 800-121, Revision 1 (Jun. 2012).

ICOP Extreme Wireless Mic, Operation Supplement, Copyright 2008.

ICOP Model 20/20-W Specifications; Enhanced Digital In-Car Video and Audio recording Systems, date: Unknown.

ICOP Mobile Dvrs; ICOP Model 20/20-W & ICOP 20/20 Vision, date: Unknown.

Bertomen, Lindsey J., PoliceOne.com News; "Product Review: ICOP Model 20/20-W," May 19, 2009.

ICOP Raytheon JPS communications, Raytheon Model 20/20-W, Raytheon 20/20 Vision Digital In-Car Video Systems, date: Unknown.

Overview of the IEEE 802.15.4 standards for Low rate Wireless Personal Area Networks, 2010 7th International Symposium on Wireless Communication Systems (ISWCS), Copyright 2010.

Lewis, S.R., Future System Specifications for Traffic Enforcement Equipment, S.R. 1 Source: IEE Colloquium (Digest), N 252, Publication Date: Nov. 18, 1996, pp. 8/1-8/2.

Kopin Corporation; Home Page; Printed Date: Oct. 16, 2014; Posted Date: Unknown; <http://www.kopin.com>.

Translation of Korean Patent No. 10-1050897, published Jul. 20, 2011.

Lilliput RV 18-50NP 5" Rear View Mirror TFT LCD Screen with Camera, Retrieved from the Internet: <URL: http://www.case-mod.com/lilliput-rv1850np-rear-view-mirror-tft-lcd-screen-with-camera-p-1271.html>, Mar. 4, 2005.

Motor Magazine Article, Recreating the Scene of an Accident, published 2005.

New Rearview-Mirror-Based Camera Display Takes the Guesswork Out of Backing Up Retrieved from the Internet: URL: http://news.thomasnet.com/fullstory/497750>, Press Release, Oct. 30, 2006.

SIIF Award for Multi Black Box, published Dec. 10, 2004.

Near Field Communication; Sony Corporation; pp. 1-7, Date: Unknown.

(56) References Cited

OTHER PUBLICATIONS

Oregon Scientific ATC Chameleon Dual Lens HD Action Camera, http://www.oregonscientificstore.com/Oregon-Scientific-ATC-Chameleon-Dual-Lens-HD-Action-Camera.data, Date Posted: Unknown; Date Printed: Oct. 13, 2014, pp. 1-4.
Asian Wolf High Quality Angel Eye Body Video Spy Camera Recorder System, http://www.asianwolf.com/covert-bodycam-hq-angeleye.html, Sep. 26, 2013, Date Posted: Unknown, pp. 1-3.
Brick House Security Body Worn Cameras / Hidden Cameras / Covert Spy Cameras, https://www.brickhousesecurity.com/hidden-cameras/bodyworn-cameras/, Sep. 26, 2013, Date Posted: Unknown, pp. 1-2.
Amazon.com wearable camcorders, http://www.amazon.com/s/ref=nb_sb_ss_i_0_4?url=search-alias%3Dphoto&field-keywords=wearable+camcorder&x=0&y=0&sprefix=wear, Sep. 26, 2013, Date Posted: Unknown, pp. 1-4.
Notification of Transmittal of the International Search Report and the Written Opinion of the International Searching Authority, or the Declaration dated Feb. 4, 2016; International Application No. PCT/US2015/056052; International Filing Date: Oct. 16, 2015; Applicant: Digital Ally, Inc.
Http://www.k-h-b.com/board/board.php?board=products01&comand=body&no=1, Current State of Technology Held by the Company, Copyright 2005.
City of Pomona Request for Proposals for Mobile Video Recording System for Police Vehicles, dated prior to Apr. 4, 2013.
Http://www.k-h-b.com/sub1_02.html, Copyright 2005.
Renstrom, Joell; "Tiny 3D Projectors Allow You to Transmit Holograms From a Cell Phone." Giant Freakin Robot. Printed Date: Oct. 16, 2014; Posted Date: Jun. 13, 2014; <http://www.giantfreakinrobot.com/sci/coming-3d-projectors-transmit-holograms-cell-phone.html>.
Request for Comment 1323 of the Internet Engineering Task Force, TCP Extensions for High Performance, Date: May 1992.
RevealMedia RS3-SX high definition video recorder, http://www.revealmedia.com/buy-t166/cameras/rs3-sx.aspx, Sep. 26, 2013, Date Posted: Unknown, pp. 1-2.
Scorpion Micro DV Video Audio Recorder, http://www.leacorp.com/scorpion-micro-dv-video-audio-recorder/, Sep. 26, 2013, Date Posted: Unknown, pp. 1-3.
"Stalker Press Room—Using In-Car Video, the Internet, and the Cloud to keep police officers safe is the subject of CopTrax live, free webinar." Stalker. Printed Date: Oct. 16, 2014; Posted Date: Jul. 31, 2014.
State of Utah Invitation to Bid State Cooperative Contract; Vendor: ICOP Digital, Inc., Contract No. MA503, Jul. 1, 2008.
Wasson, Brian; "Digital Eyewear for Law Enforcement." Printed Date: Oct. 16, 2014; Posted Date: Dec. 9, 2013; <http://www.wassom.com/digital-eyewear-for-law-enforcement.html>.
X26 Taser, Date Unknown.
Taser International; Taser X26 Specification Sheet, 2003.
Digital Ally First Vu Mountable Digital Camera Video Recorder, http://www.opticsplanet.com/digital-ally-first-vu-mountable-digital-camera-video-recorder.html?gclid=CIKohcX05rkCFSlo7AodU0IA0g&ef_id=FUjCGEAAAAWGEjrQF:20130925155534:s, Sep. 25, 2013, Date Posted: Unknown, pp. 1-4.
Drift X170, http://driftinnovation.com/support/firmware-update/x170/, Sep. 26, 2013, Date Posted: Unknown, p. 1.
Shapton, Dave "Digital Microphones: A new approach?" from soundonsound.com published Mar. 2004, 4 pages (Year: 2004).
Sharper Image User Guide, https://cdn4.sharperimage.com/si/pdf/manuals/206463.pdf, Jan. 2, 2012 (Year: 2012).
Prospero, Oregon Scientific ATC Chameleon Review, https://www.laptopmag.com/reviews/cameras/orgon-scientific-atc-chameleon, Mar. 27, 2013 (Year: 2013).
Ecplaza HY-001HD law enforcement DVR, http://fireeye.en.ecplaza.net/law-enforcement-dvr--238185-1619696.html, Sep. 26, 2013, Date Posted: Unknown, pp. 1-3.
Edesix VideoBadge, http://www.edesix.com/edesix-products, Sep. 26, 2013, Date Posted: Unknown, pp. 1-3.
GoPro Official Website: The World's Most Versatile Camera, http://gopro.com/products/?gclid=CKqHv9jT4rkCFWZk7AodyiAAaQ, Sep. 23, 2013, Date Posted: Unknown, pp. 4-9.
Isaw Advance Hull HD EXtreme, www.isawcam.co.kr, Sep. 26, 2013, Date Posted: Unknown, p. 1.
Kustom Signals VieVu, http://www.kustomsignals.com/index.php/mvideo/vievu, Sep. 26, 2013, Date Posted: Unknown, pp. 1-4.
Lea-Aid Scorpion Micro Recorder Patrol kit,http://www.leacorp.com/products/SCORPION-Micro-Recorder-Patrol-kit.html, Sep. 26, 2013, Date Posted: Unknown, pp. 1-2.
Looxcie Wearable & mountable streaming video cams, http://www.looxcie.com/overview?gclid=CPbDyv6piq8CFWeFQAodlhXC-w, Sep. 26, 2013, Date Posted: Unknown, pp. 1-4.
Midland XTC HD Video Camera, http://midlandradio.com/Company/xtc100-signup, Sep. 26, 2013, Date Posted: Unknown, pp. 1-3.
Panasonic Handheld AVCCAM HD Recorder/Player, http://www.panasonic.com/business/providevideo/ag-hmr10.asp, Sep. 26, 2013, Date Posted: Unknown, pp. 1-2.
Notification of Transmittal of the International Search Report and the Written Opinion of the International Search Authority, or the Declaration dated Jan. 30, 2014, International Application No. PCT/US2013/062415; International Filing date Sep. 27, 2013, Applicant: Digital Ally, Inc.
Point of View Cameras Military & Police, http://pointofviewcameras.com/military-police, Sep. 26, 2013, Date Posted: Unknown, pp. 1-2.
Pov.hd System Digital Video Camera, http://www.vio-pov.com/index.php, Sep. 26, 2013, Date Posted: Unknown, pp. 1-3.
Invalidity Chart for International Publication No. WO2014/000161 dated Oct. 31, 2017.
PCT Patent Application PCT/US17/16383 International Search Report and Written Opinion dated May 4, 2017.
SIV Security in Vehicle Driving Partner, http://www.siv.co.kr/, Sep. 26, 2013, Date Posted: Unknown, p. 1.
Spy Chest Mini Spy Camera / Self Contained Mini camcorder / Audio & Video Recorder, http://www.spytechs.com/spy_cameras/mini-spy-camera.htm, Sep. 26, 2013, Date Posted: Unknown, pp. 1-3.
Stalker VUE Law Enforcement Grade Body Worn Video Camera/Recorder, http://www.stalkerradar.com/law_vue.shtml, Sep. 26, 2013, Date Posted: Unknown, pp. 1-2.
SUV Cam, http://www.elmo.co.jp/suv-cam/en/product/index.html, Sep. 26, 2013, Date Posted: Unknown, p. 1.
Taser Axon Body On Officer Video/Police Body Camera, http://www.taser.com/products/on-officer-video/axon-body-on-officer-video, Sep. 23, 2013, Date Posted: Unknown, pp. 1-8.
Taser Axon Flex On-Officer Video/Police Video Camera, http://www.taser.com/products/on-officer-video/taser-axon, Sep. 26, 2013, Date Posted: Unknown, pp. 1-8.
Taser Cam Law Enforcement Audio/Video Recorder (gun mounted), http://www.taser.com/products/on-officer-video/taser-cam, Sep. 26, 2013, Date Posted: Unknown, pp. 1-3.
Tide Leader police body worn camera, http://tideleader.en.gongchang.com/product/14899076, Sep. 26, 2013, Date Posted: Unknown, pp. 1-3.
UCorder Pockito Wearable Mini Pocket Camcorder, http://www.ucorder.com/, Sep. 26, 2013, Date Posted: Unknown, p. 1.
Veho MUVI HD, http://veho-uk.fastnet.co.uk/main/shop.aspx?category=CAMMUVIHD, Sep. 26, 2013, Date Posted: Unknown, pp. 1-5.
Veho MUVI portable wireless speaker with dock, http://veho-uk.fastnet.co.uk/main/shop.aspx?category=camcorder, Sep. 26, 2013, Date Posted: Unknown, p. 1.
Vidmic Officer Worn Video & Radio Accessories, http://www.vidmic.com/, Sep. 26, 2013, Date Posted: Unknown, p. 1.
VIEVU Products, http://www.vievu.com/vievu-products/vievu-squared/, Sep. 25, 2013, Date Posted: Unknown, pp. 1-2.
WatchGuard CopVu Wearable Video Camera System, http://watchguardvideo.com/copvu/overview, Sep. 26, 2013, Date Posted: Unknown, pp. 1-2.
Witness Cam headset, http://www.secgru.com/DVR-Witness-Cam-Headset-Video-Recorder-SG-DVR-1-COP.html, Sep. 26, 2013, Date Posted: Unknown, pp. 1-2.

(56) References Cited

OTHER PUBLICATIONS

WolfCom 3rd Eye, X1 A/V Recorder for Police and Military, http://wolfcomusa.com/Products/Products.html, Sep. 26, 2013, Date Posted: Unknown, pp. 1-3.
Notification of Transmittal of the International Search Report and the Written Opinion of the International Search Authority, or the Declaration dated Jan. 14, 2016, International Application No. PCT/US2015/056039; International Filing date Oct. 16, 2015, Applicant: Digital Ally, Inc.
U.S. Appl. No. 13/959,142 Final Office Action dated Jul. 20, 2016.
U.S. Appl. No. 13/959,142 Office Action dated Nov. 3, 2015.
*Digital Ally, Inc.* vs. *Taser International, Inc.*, Case No. 2:16-cv-020232 (CJM/TJ); US D. Kan, Complaint for Patent Infringement, Jan. 14, 2016.
*Digital Ally, Inc.* vs. *Enforcement video LLC d/b/a Watchguard Video.*, Case No. 2:16-cv-02349 (CJM/TJ); US D. Kan, Complaint fFor Patent Infringement, May 27, 2016.
International Association of Chiefs of Police Digital Video System Minimum Specifications; Nov. 21, 2008.
Petition for Inter Partes Review No. 2017-00375, *Taser International, Inc.* v. *Digital Ally, Inc.*, filed Dec. 1, 2016.
Petition for Inter Partes Review No. 2017-00376, *Taser International, Inc.* v. *Digital Ally, Inc.*, filed Dec. 1, 2016.
Petition for Inter Partes Review No. 2017-00515, *Taser International, Inc.* v. *Digital Ally Inc.*, filed Jan. 11, 2017.
Petition for Inter Partes Review No. 2017-00775, *Taser International, Inc.* v. *Digital Ally Inc.*, filed Jan. 25, 2017.
PCT Patent Application PCT/US16/34345 International Search Report and Written Opinion dated Dec. 29, 2016.
State of Utah Invitation to Bid State Cooperative Contract; Vendor: Kustom Signals Inc., Contract No. MA1991, Apr. 25, 2008.
Dyna Spy Inc. hidden cameras, https://www.dynaspy.com/hidden-cameras/spy-cameras/body-worn-wearable-spy-cameras, Sep. 26, 2013, Date Posted: Unknown, pp. 1-3.
U.S. Appl. No. 15/011,132 Office Action dated Apr. 18, 2016, 19 pages.
Zepcam Wearable Video Technology, http://www.zepcam.com/product.aspx, Sep. 26, 2013, Date Posted: Unknown, pp. 1-2.
Petition for Post Grant Review No. PGR2018-00052, *Axon Enterprise, Inc.* v. *Digital Ally, Inc.*, filed Mar. 19, 2018.
MPEG-4 Coding of Moving Pictures and Audio ISO/IEC JTC1/SC29/WG11 N4668 dated Mar. 2002.
European Patent Application 15850436.6 Search Report dated May 4, 2018.
Final Written Decision for Inter Partes Review No. 2017-00375, *Axon Enterprise Inc.* v. *Digital Ally, Inc.*, dated Jun. 1, 2018.
Decision Denying Institution of Post Grant Review for Post Grant Review No. PGR2018-00052, *Axon Enterprise, Inc.* v. *Digital Ally, Inc.*, issued Oct. 1, 2018.

\* cited by examiner

REDUNDANT MOBILE VIDEO RECORDING

TECHNICAL FIELD

Embodiments of the invention relate to video recording. More specifically, embodiments of the invention relate to redundant storage for mobile video recording.

Traditional video recordings lack the reliability to be properly authenticated and used as evidence in legal proceedings. Further, existing video recording systems fail to provide redundant storage of said video recordings, which makes the recordings vulnerable to tampering and loss. Further still, traditional video recordings fail to incorporate additional information associated with a triggering event, which would otherwise provide additional authentication and insight into the event.

SUMMARY

Embodiments of the invention solve the above-mentioned problems by providing systems, methods, and computer-readable media for storing and authenticating event related video data. Redundant storage of additional copies of event related video data provides further reliability and security, which, in some cases, makes the video data more suitable as evidence. Further, bi-directional communication between a video recording manager device and one or more cameras provides additional opportunities in terms of allocating recording and storage resources, as well as providing a control hierarchy for optimizing the security and reliability of recording operations.

In some aspects, the techniques described herein relate to a video recording authentication system for redundantly storing event related video data, the video recording authentication system including: one or more cameras configured to continuously record video data, wherein each of the one or more cameras includes an internal storage medium using a circular storage buffer for storing the continuously recorded video data; at least one sensor; and a video recording manager device communicatively coupled to the one or more cameras and the at least one sensor, the video recording manager device configured to transmit a triggering event signal to the one or more cameras based on a triggering event indication received from the at least one sensor, the video recording manager device including: a first storage medium storing triggering event related video data received from the one or more cameras, the triggering event related video data including at least a portion of the video data stored in the circular storage buffer recorded prior to receiving the triggering event indication and authentication metadata associated with the triggering event indication for authenticating the triggering event related video data; a second storage medium storing an additional copy of the triggering event related video data received from the one or more cameras, wherein the second storage medium is removable from the video recording manager device; and a wireless transceiver configured to transmit the triggering event related video data including the authentication metadata over a wireless network to a cloud-based storage system.

In some aspects, the techniques described herein relate to a video recording authentication system, wherein each of the one or more cameras, the at least one sensor, and the video recording manager device are mounted within a law enforcement vehicle.

In some aspects, the techniques described herein relate to a video recording authentication system, wherein the at least one sensor includes a proximity tag reader.

In some aspects, the techniques described herein relate to a video recording authentication system, wherein the authentication metadata is augmented to include proximity tag data indicative of an officer identifier associated with a law enforcement officer in proximity to the law enforcement vehicle.

In some aspects, the techniques described herein relate to a video recording authentication system, wherein the at least one sensor includes a GPS receiver and the authentication metadata further includes location information.

In some aspects, the techniques described herein relate to a video recording authentication system, wherein the one or more cameras include a body-mounted camera mounted on a law enforcement officer, the body-mounted camera including a wireless transceiver for communicating with the video recording manager device.

In some aspects, the techniques described herein relate to a video recording authentication system, wherein the internal storage medium of the one or more cameras includes a partitioned storage including a first portion associated with the circular storage buffer and a second portion for storing the triggering event related video data.

In some aspects, the techniques described herein relate to a method for redundantly storing event related video data, the method including: continuously recording video data using one or more cameras; storing the continuously recorded video data from the one or more cameras within an internal storage medium of each respective camera; receiving, via a video recording manager device, a triggering event indication from at least one sensor; responsive to receiving the triggering event indication, transmitting, via the video recording manager device, a triggering event signal to the one or more cameras, the triggering event signal initiating a triggering event recording procedure within each of the one or more cameras; receiving triggering event related video data from the one or more cameras into the video recording manager device, the triggering event related video data including at least a portion of the video data stored in the internal storage medium recorded prior to receiving the triggering event indication; storing the triggering event related video data within a first storage medium of the video recording manager device along with authentication metadata associated with the triggering event indication for authenticating the triggering event related video data; storing an additional copy of the triggering event related video data within a second storage medium of the video recording manager device along with the authentication metadata; and transmitting, from the video recording manager device, the triggering event related video data with the authentication metadata to a cloud-based storage system.

In some aspects, the techniques described herein relate to a method, further including: transmitting, from the video recording manager device, the authentication metadata to the one or more cameras to authenticate the video data stored in the internal storage medium of each respective camera.

In some aspects, the techniques described herein relate to a method, further including: preventing overwriting of the triggering event related video data on the internal storage medium of each of the one or more cameras before the triggering event related video data is stored by the cloud-based storage system.

In some aspects, the techniques described herein relate to a method, further including: receiving, at the video recording manager device, a confirmation message confirming storage of the triggering event related video data by the cloud-based storage system; and responsive to receiving the confirmation message, allowing overwriting of the triggering event related video data from the internal storage of each of the one or more cameras.

In some aspects, the techniques described herein relate to a method, further including: comparing the triggering event related video data to the additional copy of the triggering event related video data to authenticate the triggering event related video data as evidence.

In some aspects, the techniques described herein relate to a method, wherein the triggering event signal transmitted by the video recording manager device includes an instruction to adjust a set of recording parameters of the one or more cameras based at least in part on a type of the triggering event indication.

In some aspects, the techniques described herein relate to a method, wherein the set of recording parameters includes a video resolution, a frame rate, and a shutter speed.

In some aspects, the techniques described herein relate to one or more non-transitory computer-readable media storing computer-executable instructions that, when executed by at least one processor, perform a method for redundantly storing event related video data, the method including: continuously recording video data using one or more cameras; storing the continuously recorded video data from the one or more cameras within an internal storage medium of each respective camera using a circular storage buffer; receiving, via a video recording manager device, a triggering event indication from at least one sensor; responsive to receiving the triggering event indication, transmitting, via the video recording manager device, a triggering event signal to the one or more cameras, the triggering event signal initiating a triggering event recording procedure within each of the one or more cameras; receiving triggering event related video data from the one or more cameras into the video recording manager device, the triggering event related video data including at least a portion of the video data stored in the circular storage buffer recorded prior to receiving the triggering event indication; storing the triggering event related video data within a first storage medium of the video recording manager device along with authentication metadata associated with the triggering event indication for authenticating the triggering event related video data; and storing an additional copy of the triggering event related video data within a second storage medium of the video recording manager device along with the authentication metadata.

In some aspects, the techniques described herein relate to a computer-readable media, further including: transmitting, from the video recording manager device, the triggering event related video data with the authentication metadata to a cloud-based storage system.

In some aspects, the techniques described herein relate to a computer-readable media, further including: responsive to the triggering event signal, transferring the one or more cameras from a standard continuous recording mode into a triggering event recording mode.

In some aspects, the techniques described herein relate to a computer-readable media, wherein the triggering event recording mode is associated with an updated set of video recording parameters for increasing a video quality of the triggering event related video data compared to the standard continuous recording mode.

In some aspects, the techniques described herein relate to a computer-readable media, wherein the standard continuous recording mode is associated with a pixel resolution of 720p and the triggering event related video data is associated with a pixel resolution selected from the set consisting of 1080p and 4K.

In some aspects, the techniques described herein relate to a computer-readable media, wherein the circular storage buffer includes a temporary first-in-first-out storage procedure operable to store up to 168 hours of video data.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
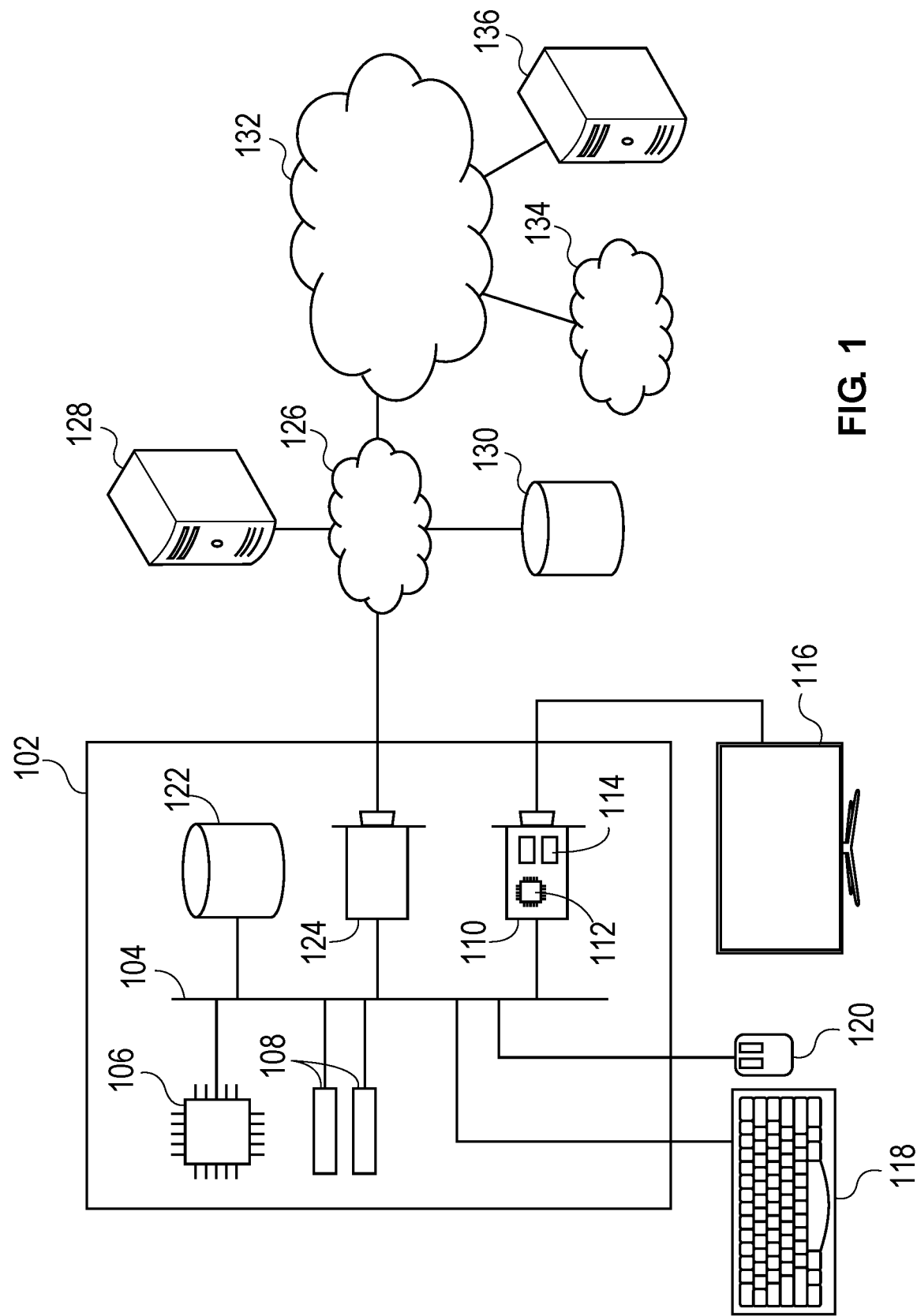
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is the central processing unit CPU 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Computer-readable media include both volatile and non-volatile media, removable and nonremovable media, and contemplate media readable by a database, as well as transitory and non-transitory forms of media. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as local network 126. NIC 124 can be any form of network interface known in the art, such as Ethernet, ATM, fiber, Bluetooth®, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
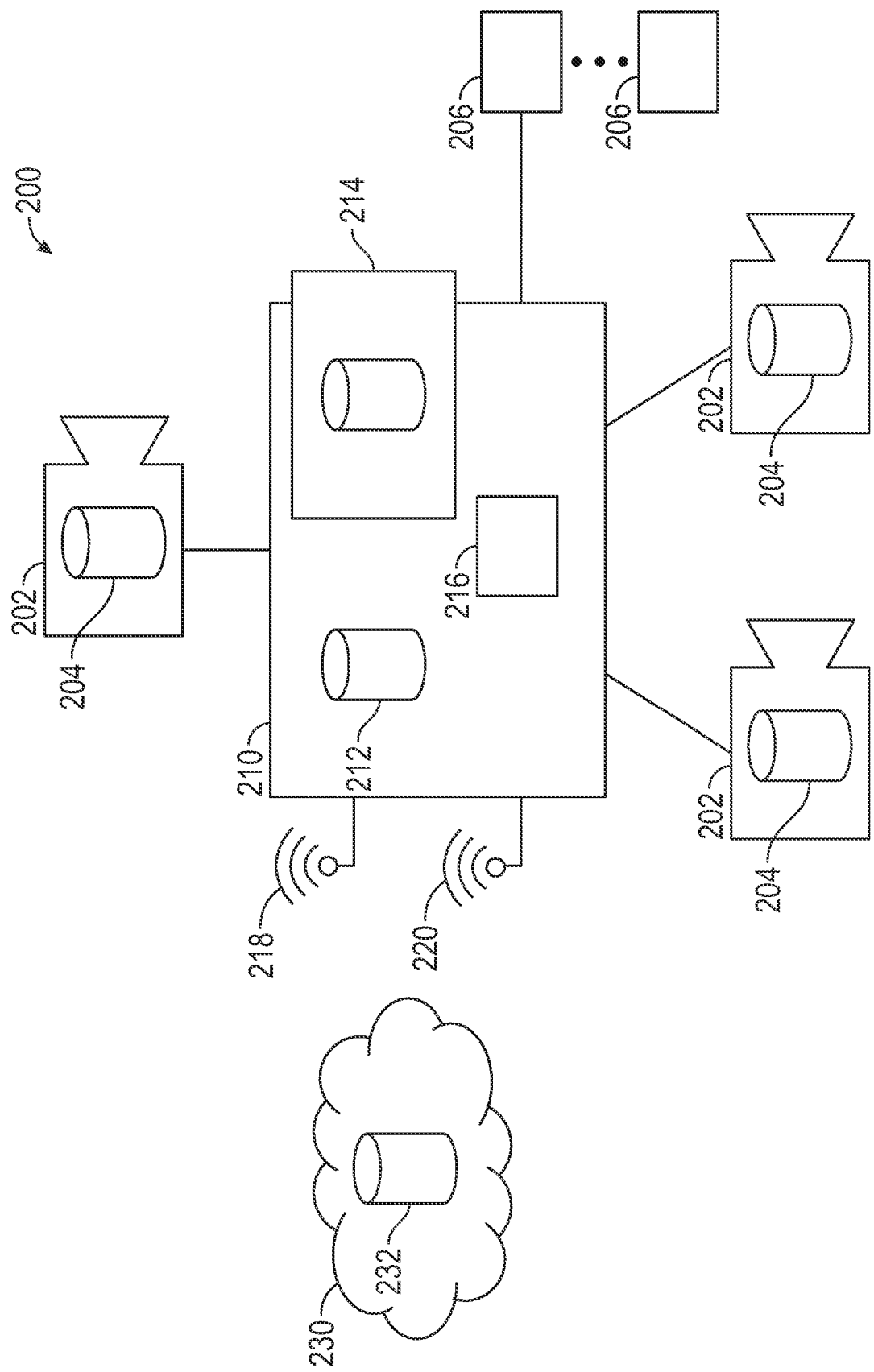
FIG. 2 depicts an exemplary video recording authentication system relating to some embodiments of the invention.

Turning now to FIG. 2, one example of a video recording authentication system 200 is depicted relating to some embodiments of the invention. In some embodiments, the video recording authentication system 200 comprises one or more cameras 202. In some embodiments, the one or more cameras 202 may comprise any combination of video cameras, still cameras, and microphones. For example, in some embodiments, the one or more cameras comprises a video camera configured to record both video and audio data. In some embodiments, the one or more cameras 202 may comprise mobile battery-powered cameras. Alternatively, or additionally, the one or more cameras 202 may be powered or charged from an external power source. For example, if the one or more cameras 202 are installed within a vehicle they may be electrically connected to the vehicle electrical systems such that the one or more cameras 202 may receive power from a vehicle battery of the vehicle. In some embodiments, each of the one or more cameras comprises an internal storage medium 204, as shown. Accordingly, the internal storage medium 204 may be configured to store video data captured by each respective camera of the one or more cameras 202. It should be understood that in some embodiments, each respective camera of the one or more cameras 202 comprise a video camera and that said video camera may further include one or more microphones such that the video camera is configured to capture both audio data and video data.

In some embodiments, the one or more cameras 202 are adapted to various different recording environments. For example, the one or more cameras 202 may be adapted to operate at a wide temperature range such that video recording quality is not affected by extreme temperatures. Additionally, the one or more cameras 202 may be suitable for recording under extreme vibration and other physically challenging recording circumstances. In some embodiments, at least one of the one or more cameras 202 may comprise a vibration dampening mounting structure which reduces vibration to increase recording quality. Further, in some embodiments, various software techniques may be used on the backend to remove vibration effects from video data. For example, an optical tracking algorithm may be applied to remove vibration effects after the video data has been recorded.

In some embodiments, the video recording authentication system 200 further comprises a sensor 206 or a plurality of such sensors. In some embodiments, the sensor 206 comprises any of a radio frequency identifier (RFID) tag reader, an accelerometer, a global positioning system (GPS) receiver, a motion sensor, an acoustic sensor, a pressure sensor, or other suitable types of sensors. Embodiments are contemplated in which the sensor 206 may be incorporated into one of the one or more cameras 202. For example, in some embodiments, the sensor 206 comprises an RFID tag reader disposed on or within at least one of the one or more cameras 202.

In some embodiments, the video recording authentication system 200 comprises a video recording manager device 210, as shown, for managing one or more sets of video data from the one or more cameras 202. Accordingly, in some embodiments, the video recording manager device 210 may be communicatively coupled to the one or more cameras 202. In some such embodiments, any combination of wired and wireless communication connections are contemplated. For example, in some embodiments, a BLUETOOTH wireless connection may be established between at least one of the one or more cameras 202 and the video recording manager device 210. Additionally, in some embodiments, a wired connection may be established, for example, using a USB or Ethernet connection, to transmit signals between the video recording manager device 210 and the one or more cameras 202.

In some embodiments, the communication connection between the video recording manager device 210 and the one or more cameras 202, whether wired or wireless, allows for video data captured from the one or more cameras 202 to be transmitted to the video recording manager device 210 and control signals to be communicated from the video recording manager device 210 to the one or more cameras 202. Further, embodiments are contemplated in which control signals may additionally be transmitted from the one or more cameras 202 to the video recording manager device 210. Accordingly, the communication connection may be established such that bidirectional communication is supported between the video recording manager device 210 and the one or more cameras 202. The bidirectional communication connection between the video recording manager device 210 and the one or more cameras 202 allows both control and data signals to be transmitted back and forth from the one or more cameras 202. Accordingly, embodiments are contemplated in which the video recording manager device 210 provides control signals for controlling recording operations of the one or more cameras 202 based at least in part on data signals received from the one or more cameras 202. Further still, the video recording manager device 210 may monitor parameters of the one or more cameras 202 such as, for example, battery life, remaining storage capacity, recording quality, as well as other camera-specific parameters.

In some embodiments, the video recording manager device 210 comprises a first storage medium 212 and a second storage medium 214 disposed within the video recording manager device 210. In some such embodiments, the first storage medium 212 and the second storage medium 214 are configured to store video data captured by the one or more cameras 202 in addition to related metadata, as will be described in further detail below. In some embodiments, at least one of the storage mediums may be removable from the video recording manager device 210. For example, in some embodiments, the second storage medium 214 is removably mounted within or onto the video recording manager device 210. In one example, the second storage medium 214 comprises a removable USB flash memory device, an SD card, or the like, such that the second storage medium 214 may be added and removed from the video recording manager device 210 to physically transfer the contents of the second storage medium 214, which as described above may include video data captured by the one or more cameras 202.

In some embodiments, the video recording manager device 210 further comprises a controller 216 disposed within the video recording manager device 210. In some embodiments, the controller 216 is configured to control the operation of the video recording manager device 210. For example, the controller 216 may monitor data received from the one or more cameras 202 and the sensor 206 to determine instructions to be sent to the one or more cameras 202 and to further instruct storage of data on the first storage medium 212 and the second storage medium 214. In some embodiments, the controller 216 further instructs storage on the internal storage medium 204 of each respective camera of the one or more cameras 202. In some embodiments, the controller 216 monitors a signal received from the sensor 206 to determine a triggering event. For example, in some embodiments, the sensor 206 may provide a signal including a triggering event indication which initiates a triggering event procedure of the video recording manager device 210.

In some embodiments, a number of different types of triggering events are contemplated including a variety of manually and automatically initiated triggers. For example, in some embodiments, a triggering event may be initiated by a law enforcement officer of other user performing any of a number of actions such as flashing lights, braking, activating sirens of a law enforcement vehicle, as well as driver monitoring parameters such as, using a cell phone, not wearing a seatbelt, or falling asleep. Further, in some embodiments, triggering events may be initiated based on vehicle-specific parameters such as lane departer and following too close to another vehicle, as well as other vehicle-specific parameters such that instances of traffic accidents may be recorded as event-related video data.

In some embodiments, the video recording manager device 210 further comprises a wireless transceiver 218 that may be internal or external to the video recording manager device 210. In some such embodiments, the wireless transceiver 218 may comprise a radio transceiver for receiving and transmitting radio waves. Additionally, in some embodiments, the video recording manager device 210 comprises a Wi-Fi transceiver 220 that may be internal or external to the video recording manager device 210. Here, the Wi-Fi transceiver 220 may be configured to wirelessly transmit and receive Wi-Fi signals over a network. Embodiments are contemplated in which either of the wireless transceiver 218 or the Wi-Fi transceiver 220 may be used to establish communication with the one or more cameras 202 and/or the sensor 206. Alternatively, or additionally, in some embodiments, as described above, the one or more cameras 202 and the sensor 206 may be communicatively coupled via a wired connection. Further still, embodiments are contemplated in which a devoted wireless connection may be established with each of the one or more cameras 202. For example, one or more additional wireless transceivers may be included to communicate with the one or more cameras 202.

In some embodiments, the wireless transceiver 218 and/or the Wi-Fi transceiver 220 are operable to communicate with a cloud-based storage system 230. In some embodiments, the cloud-based storage system 230 comprises a cloud data store 232, as shown, for remotely storing data. As such, embodiments are contemplated in which video data captured by the one or more cameras 202 is transmitted to the cloud-based storage system 230 from the video recording manager device 210 and stored in the cloud data store 232. For example, in some embodiments, it may be desirable to store the video data within the cloud data store 232 to provide a redundant copy of the video data which is insured against physical destruction of the video recording manager device 210 and the one or more cameras 202. In some such embodiments, the video data may be transmitted to the cloud-based storage system 230, for example, by using the Wi-Fi transceiver 220 to transmit the video data over a wireless network.

In some embodiments, the recording and storage parameters of the one or more cameras 202 may be controlled based on various signals monitored by the video recording manager device 210. For example, in some embodiments, a sensor 206 (or a plurality of such sensors) may be used to monitor ambient conditions such that the video recording manager device 210 can provide control signals for optimizing recording based on said ambient conditions. In one example, a humidity sensor such as a hygrometer may be used to measure the amount of water vapor in the ambient air such that the recording parameters may be adjusted for recording in a foggy environment. Further still, embodiments are contemplated in which the one or more cameras 202 may include internal fans for reducing or removing condensation from the camera lens. In another example, a sensor may be included for monitoring the ambient lighting conditions. Accordingly, the video recording manager device 210 may adjust the recording parameters such as by instructing the one or more cameras 202 to switch into a night-vision recording mode. Embodiments are also contemplated in which the one or more cameras 202 may be controlled individually. For example, in some embodiments, the one or more cameras 202 include an internal controller interfacing with one or more sensors to perform any of the operations described herein with respect to the controller 216 and the sensors 206.

Additionally, embodiments are contemplated in which computer-vision techniques may be applied for monitoring video data from the one or more cameras 202. For example, in some embodiments, the video recording manager device 210 may utilize computer vision to identify objects within the video data and control recording parameters accordingly. In one example, computer-vision may determine that one of the cameras is covered by an object or obstacle such that an event scene is not visible. Based on this determination, the video recording manager device 210 may transmit a signal to the camera to adjust the recording angle to move around the obstacle or alternatively, to turn the camera off to save storage space and battery life. Further still, computer-vision techniques may be utilized to identify persons or objects of interest and focus or adjust recording parameters to ensure the persons or objects of interest are clearly visible within the video data. In some embodiments, the computer-vision techniques may be applied using any combination of additional hardware and software. For example, a computer-vision algorithm may be applied using the controller 216 to analyze the received video data. Alternatively, in some embodiments, said computer-vision techniques may be applied independently by the one or more cameras 202, for example, using a respective internal controller of each of the one or more cameras 202.

Figure 3:
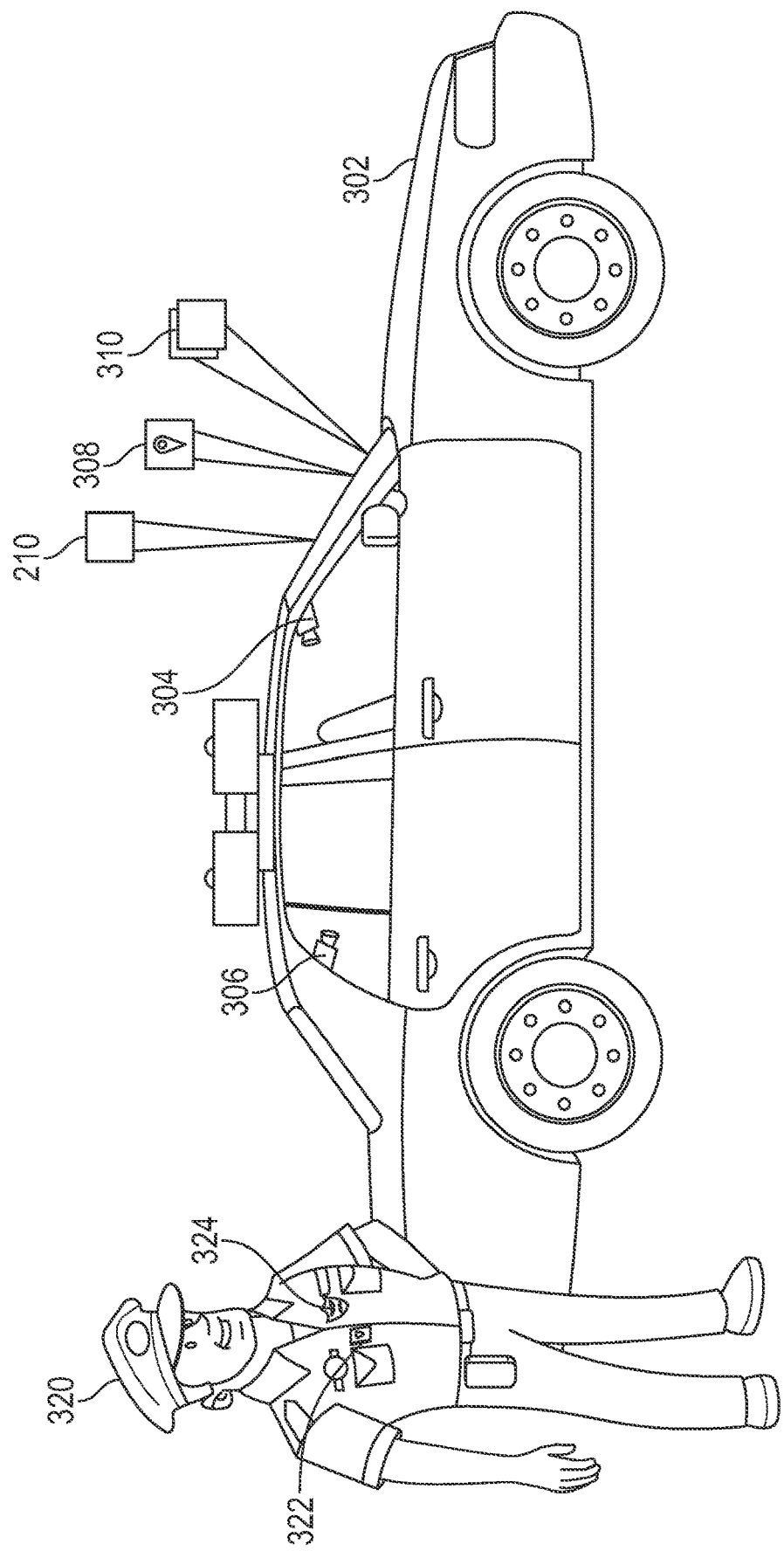
FIG. 3 depicts an exemplary operational environment relating to some embodiments of the invention.

Turning now to FIG. 3, an exemplary operational environment is depicted relating to some embodiments of the invention. In some embodiments, a vehicle 302 may be included which may be a law enforcement vehicle, as shown. In some such embodiments, the vehicle 302 may include any number of vehicle-mounted cameras, such as, for example, a front vehicle-mounted camera 304 and a rear vehicle-mounted camera 306, as shown. In some embodiments, the front vehicle-mounted camera 304 may be rear-facing and configured to record an interior of the vehicle 302, while the rear vehicle-mounted camera 306 may be front-facing and configured to record an interior of the vehicle 302. Additionally, or alternatively, vehicle-mounted cameras may be included for recording exterior views of the vehicle 302. For example, in some embodiments, a front-facing front vehicle mounted camera may be included for recording video data in front of the vehicle. It should be understood that in some embodiments, any number of vehicle-mounted cameras may be included for recording video data at any angle respective to the vehicle 302. Further, embodiments are contemplated in which the cameras may be rotatably mounted within the vehicle 302 such that the angle may be selectable. Further still, in some embodiments, the angle of the vehicle-mounted cameras may be adjusted automatically, for example, based on instructions received from the controller 216. In some embodiments, either or both of the front vehicle-mounted camera 304 and the rear vehicle-mounted camera 306 may perform any of the actions described herein with respect to the one or more cameras 202. For example, in some embodiments, each of the front vehicle-mounted camera 304 and the rear vehicle-mounted camera 306 comprise an internal storage medium 204 configured to store recorded video data.

In some embodiments, any number of sensors may be included within the vehicle 302. In some embodiments, a GPS receiver 308 may be included for collecting location data associated with the vehicle 302. In some embodiments, one or more additional sensors 310 may be included for collected data associated with the vehicle 302 or additional data related to a triggering event. In some embodiments, the GPS receiver 308 and the one or more additional sensors 310 may be communicatively coupled to the video recording manager device 210. For example, in some such embodiments, the GPS receiver 308 and the one or more additional sensors 310 may perform similar operations as described herein with respect to the sensor 206. Embodiments are contemplated in which existing sensors of the vehicle 302 may be incorporated into the video recording system by establishing communication with the video recording manager device 210. Said communication may include any suitable forms of wireless or wired communication connections, such as, BLUETOOTH, Wi-Fi, Ethernet, USB, and other suitable communication connections.

In some embodiments, an operator 320, who may be a law enforcement officer, wears a body-mounted camera 322. For example, the body-mounted camera 322 may comprise a video camera including a clip for securing the camera to a shirt or other garment of the operator 320. In some embodiments, the operator 320 may also include a proximity tag 324. For example, the proximity tag 324 may be included within a badge of the law enforcement officer and is associated with a unique officer identifier for identifying the law enforcement officer. Accordingly, embodiments are contemplated in which the one or more additional sensors 310 include a proximity tag reader operable to read the proximity tag 324 for determining the presence of the operator 320. For example, in some embodiments, the proximity tag reader captures proximity tag data including an officer identifier which may be included within the authenticated video data. In some embodiments, the proximity tag data may be timestamped or even included within individual frames of the video data such that the video data shows when the operator is present within video data even if the operator 320 is off screen.

In some embodiments, the video recording manager device 210 is further interfaced with the electronics of the vehicle 302 such that various aspects of the vehicle 302 may be monitored in order to detect a triggering event. For example, in some embodiments, the video recording manager device 210 may receive a signal from the electronics of the vehicle 302 indicative of an airbag status, such that a triggering event can be associated with deployment of the airbags. It should be understood that various other vehicle-specific parameters may be monitored and potentially associated with triggering events.

It should be understood that, though embodiments of the invention are described above as relating to law enforcement, additional embodiments are contemplated that relate to other operational environments. For example, in some embodiments, the video recording/authentication systems and methods described herein may be employed for general security recording and surveillance applications. As such, said systems may include any number of cameras, which may be vehicle-mounted, body-mounted, or mounted onto stationary structures such as buildings. Further, embodiments may be employed for monitoring delivery operations and other services.

Figure 4:
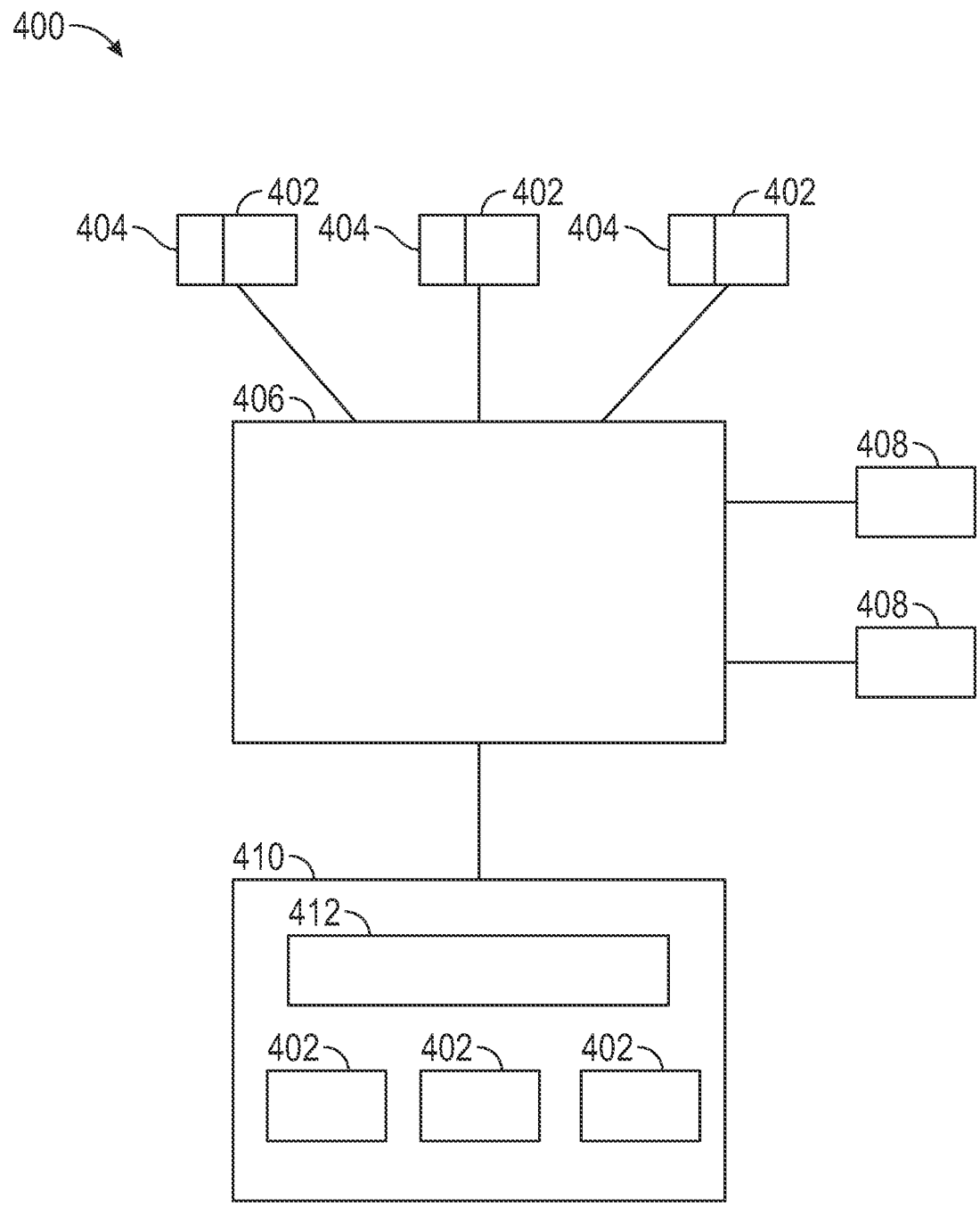
FIG. 4 depicts an exemplary video recording diagram relating to some embodiments of the invention.

Turning now to FIG. 4, an exemplary video recording diagram 400 is depicted relating to some embodiments of the invention. In some embodiments, one or more sets of individual video data 402 paired with individual video metadata 404 are received at a combiner 406, as shown. In some embodiments, the combiner 406 may be included within the video recording manager device 210. For example, in some embodiments, the controller 216 may be operable to perform the combining operations described herein with respect to the combiner 406. In some such embodiments, each of the sets of individual video data 402 are received from a respective one of the one or more cameras 202. Accordingly, the individual video metadata 404 may include an identifier associated with the respective camera such that the individual video metadata 404 may be used to identify the particular camera of the one or more cameras 202 that recorded the individual video data 402.

In some embodiments, the combiner 406 also receives one or more sets of sensor data 408 from one or more respective sensors. The combiner 406 is configured to combine the one or more sets of individual video data 402 and the one or more sets of sensor data 408. In some embodiments, the combiner 406 combines multiple streams of video data and sensor data in real time, such that live streams are combined as they are recorded by the one or more cameras 202. Alternatively, in some embodiments, the video data may be combined after completion of the triggering event. For example, the video data may be combined directly after completion of the triggering event responsive to a completion indication or at a later time such as, an hour, a day, a week, or another suitable period of time after the triggering event. Further, in some embodiments, the video data may be combined at any time in response to a manual combination request submitted by a user.

In some embodiments, the combiner 406 outputs a set of composite authenticated video data 410, as shown. Here, the composite authenticated video data 410 comprises authentication metadata 412 and the one or more sets of individual video data 402 received from the one or more cameras 202. In some embodiments, the authentication metadata includes any of the sensor data 408, a triggering event indication, a time stamp, a user identifier, one or more digital signatures, as well as other data suitable to authenticate the video data. In some embodiments, a digital signature may be added to each set of individual video data 402 (for example, within the individual video metadata 404 corresponding to the individual video data 402) to identify the camera which recorded the individual video data 402. Further, in some embodiments, a digital signature associated with the video recording manager device 210 may be included within the authentication metadata 412 to identify the video recording manager device 210. In some such embodiments, the digital signature may include a unique identifier corresponding to the video recording manager device 210. In some embodiments, additional digital signatures may be included for identifying the sensor 206.

Figure 5:
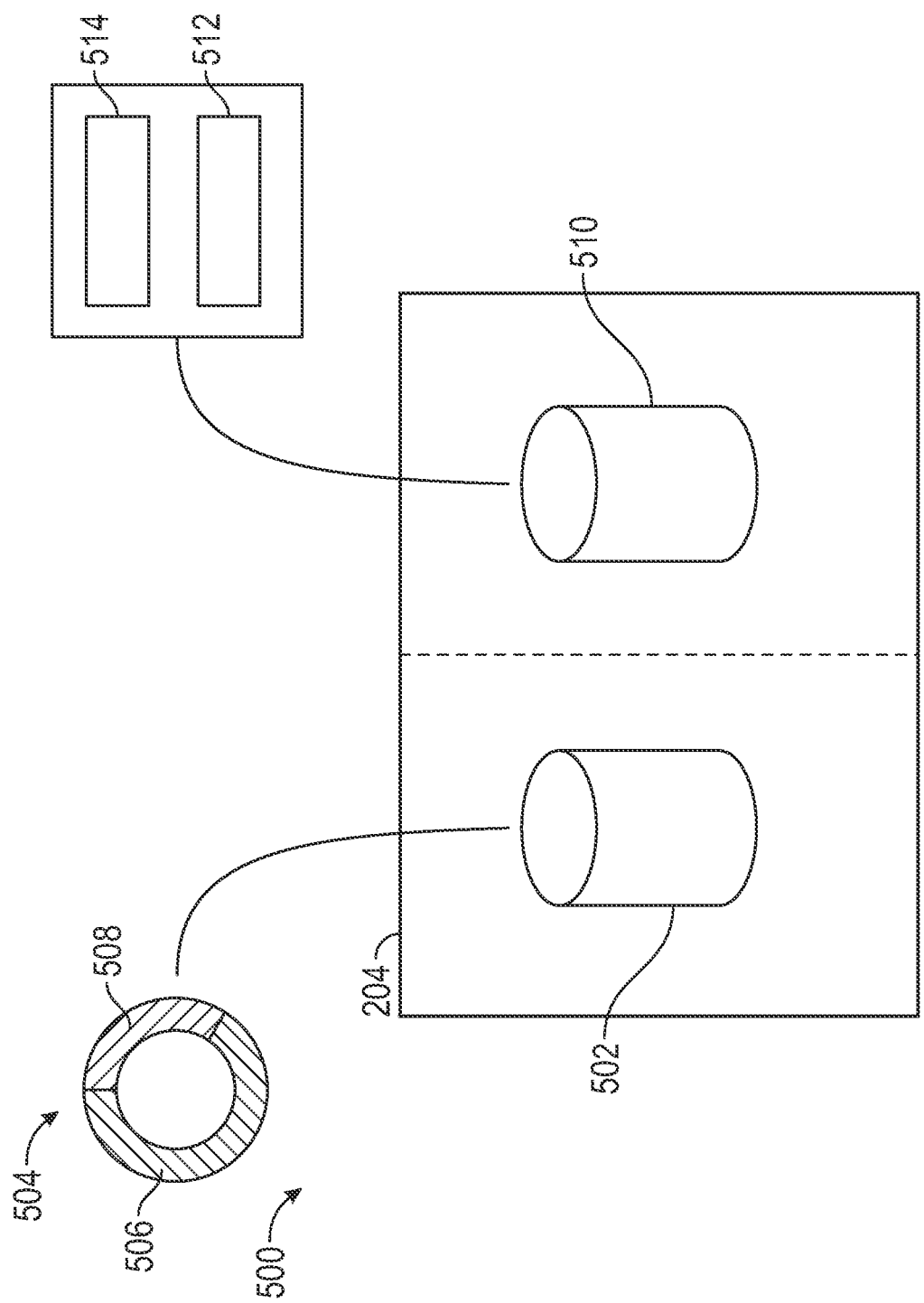
FIG. 5 depicts an exemplary storage diagram relating to some embodiments of the invention.

Turning now to FIG. 5, an exemplary storage diagram 500 is depicted relating to some embodiments of the invention. In some embodiments, the internal storage medium 204 of the one or more cameras 202 may be partitioned, as shown. Here, the internal storage medium 204 may include a first portion 502, which in some embodiments, includes a circular storage buffer 504, as shown. The circular storage buffer 504 is configured to continuously store video data by overwriting previously stored video data 506 with new video data 508. In some embodiments, the circular storage buffer 504 comprises a temporary first-in-first-out storage procedure operable to store up to one week or 168 hours of video data. However, embodiments are contemplated in which different sizes of storage media may be used that may store varying amounts of video data.

It should be understood that the amount of video data that can be stored depends further on the specific recording parameters of the video data. For example, a set of video data with a resolution of 2160 pixels (2160p or 4K) or 1080 pixels (1080p) may require significantly more storage than video data with a lower resolution. Thus, a similar storage device may be operable to store about 168 hours of standard quality video data at a resolution of 720 pixels (720p) or about 70 hours of higher quality video data at a resolution of 1080p. Further still, embodiments are contemplated in which a combination of video data at multiple resolutions may be stored.

In some embodiments, the internal storage medium 204 further comprises a second portion 510. Here, the second portion 510 may be configured to store triggering event related video data 512 along with authentication metadata 514. In some embodiments, the triggering event related video data 512 may be received from the video recording manager device 210. For example, in some embodiments, the composite authenticated video data 410 may be communicated back to the one or more cameras 202 and stored within the internal storage medium 204 of each camera. Alternatively, in some embodiments, the triggering event related video data 512 may comprise video data transferred from the circular storage buffer 504 based on a received triggering event signal. For example, in some embodiments, the internal storage medium 204 may be configured to automatically transfer a portion of the video data in the circular storage buffer 504 to the second portion 510 responsive to receiving a triggering event signal. Accordingly, the video data leading up to a triggering event indication may be captured and preserved within the triggering event related video data 512. In some embodiments, the triggering event related video data 512 comprises video data captured prior to receiving the triggering event indication, as well as video data recorded for a predetermined period of time after receiving the triggering event indication. In some embodiments, the predetermined period of time may be adjusted based on a type of triggering event.

Additionally, embodiments are contemplated in which alternative storage procedures may be included. For example, in some embodiments, video data may be continuously recorded at a high video quality such as a resolution of 1080p or 4K. Here, the high-quality video data may be stored within the circular buffer for a predetermined period of time. If a triggering event occurs at least a portion of the high-quality video data may be transmitted to the video recording manager device 210. Alternatively, if no triggering event occurs over the predetermined period of time, the high-quality video data may be deleted or converted into a lower quality to increase storage availability. For example, the video data may initially be stored at the resolution of 1080p or 4K and after an hour be converted to a resolution of 720p or lower such that the video data occupies less storage space in the internal storage medium 204 of the one or more cameras 202. By initially storing video data at a high quality, the video data may be retroactively captured as event data leading up to a triggering event while maintaining high video quality. Further, since the high-quality storage may only be temporary, additional benefits in terms of storage capacity are achieved. Further still, embodiments are contemplated in which the predetermined time period for temporarily storing high-quality video data may be determined based at least in part on the remaining storage capacity or a signal received from the video recording manager device 210, such that, if storage is available high-quality video data may be captured and maintained. Accordingly, all of the available storage space may be utilized based on availability such that the storage is optimized for various recording environments.

In some embodiments, the one or more cameras may be configured to continuously record video data at a lower video quality with a lower resolution and lower bit rate to reduce the data resources used. Here, a higher video quality with a higher resolution and higher bit rate may be used while recorded event-related video data to increase the video quality of the event-related video data. In some embodiments, various other resolutions and bit rates may be used. For example, in some embodiments, a 4K resolution may be used to record at a higher video quality, while a pixel resolution of 720p or 1080p may be used for a lower video quality. Alternatively, in some embodiments, a single video quality may be used for both continuous recording and event-related recording.

Figure 6:
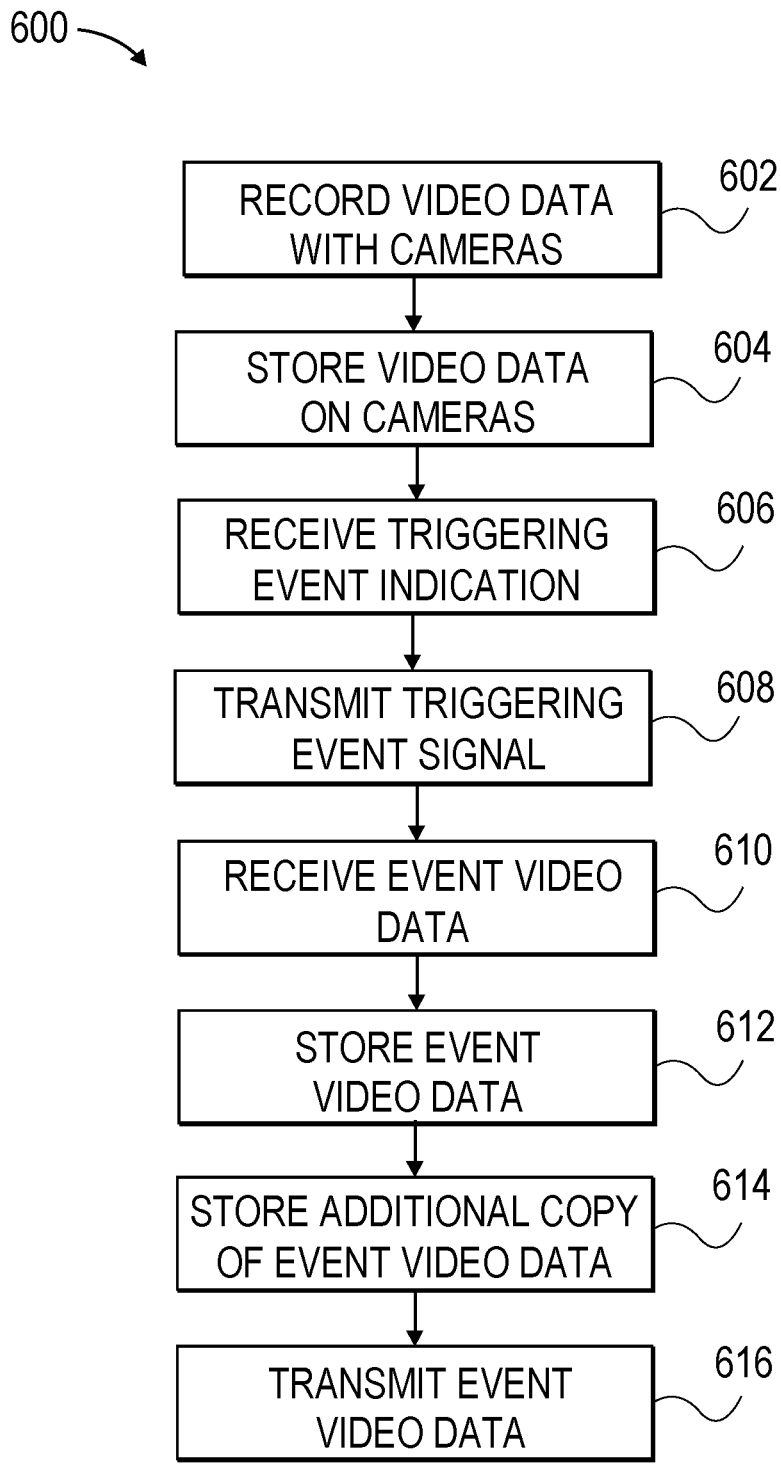
FIG. 6 depicts an exemplary method for authenticatable redundant video recording and storage relating to some embodiments of the invention.

Turning now to FIG. 6, an example of a method 600 for authenticatable redundant video recording and storage is depicted relating to some embodiments of the invention. It should be understood that, in some embodiments, any of the steps described herein with respect to method 600 may be executed on at least one processor. For example, in some embodiments, at least a portion of the steps may be carried out by a processor associated with the controller 216 of the video recording manager device 210. Additionally, embodiments are contemplated in which processing may be split between two or more processors with a first processor performing a first portion of steps and a second processor performing a second portion of steps.

At step 602, video data is recorded at the one or more cameras 202. In some embodiments, the video data is continuously recorded at each camera. Further, in some embodiments, the video data further comprises audio data recorded by one or more microphones associated with each respective camera. In some embodiments, continuously recording video data allows the preservation of video footage leading up to a triggering event.

At step 604, the recorded video data is stored on each of the one or more cameras 202. In some embodiments, the video data may be stored within the internal storage medium 204 of each camera. Further, in some embodiments, the circular storage buffer 504 may be used to continuously record video data from each respective camera.

At step 606, a triggering event indication is received from at least one sensor, such as sensor 206. In some embodiments, the triggering event indication may comprise sensor data received from the sensor 206, which is monitored by the video recording manager device 210. Accordingly, embodiments are contemplated in which the sensor 206 does not identify or classify the sensor data as including a triggering event indication. Instead, in such embodiments, the sensor 206 provides raw sensor data to the video recording manager device 210 and the video recording manager device 210 determines whether the raw sensor data comprises a triggering event indication. Alternatively, or additionally, in some embodiments, the sensor 206 may be operable to identify triggering event indications. Further still, embodiments are contemplated in which the triggering event indication may be received manually by an operator. For example, the sensor 206 may comprise a button or other interface element operable to receive an input which provides a triggering event indication. For example, an operator may manually opt to initiate a triggering event by providing such an input, which may be received in proximity to the video recording manager device 210 or may be received remotely. For example, embodiments are contemplated which allow a remote operator to transmit a triggering event indication input over a network to the video recording manager device 210.

At step 608, a triggering event signal is transmitted from the video recording manager device 210 to the one or more cameras 202. In some embodiments, the triggering event signal is transmitted in response to receiving the triggering event indication from the at least one sensor. For example, when the video recording manager device 210 receives sensor data which is indicative of a triggering event the video recording manager device 210 transmits the triggering event signal such that a triggering event procedure is initiated within the system. In some embodiments, the triggering event signal changes the operation and/or recording parameters of the one or more cameras 202. In some embodiments, the triggering event signal requests video data from the one or more cameras 202.

In some embodiments, the triggering event signal is operable to control video recording parameters of the one or more cameras 202. For example, in some embodiments, the triggering event signal instructs the one or more cameras 202 to switch from a standard continuous recording mode to a triggering event recording mode that may be associated with higher quality recording parameters. In some embodiments, the triggering event signal adjusts one or more recording parameters of the one or more cameras 202, such as, any of a video resolution, a frame rate, a shutter speed, as well as other recording parameters. In some embodiments, it may be desirable to increase video recording quality for a certain duration of time associated with a triggering event, such that the aspects of the event are suitably captured.

At step 610, triggering event related video data is received from the one or more cameras 202 at the video recording manager device 210. In some embodiments, the triggering event related video data comprises any combination of previously recorded video data from before receiving the triggering event indication, post-recorded video data from after receiving the triggering event indication, and live recorded video data received in real time directly after being recorded by the one or more cameras 202. In some embodiments, the one or more cameras 202 are configured to provide the triggering event related video data responsive to receiving the triggering event signal from the video recording manager device 210. In some embodiments, the triggering event related video data comprises at least a portion of the video data stored within the internal storage medium of the one or more cameras 202. For example, in some embodiments, a portion of the video data stored using the circular storage buffer 504 corresponding to a predetermined period of time before the triggering event was received may be transmitted to the video recording manager device 210 as triggering event related video data. In one example, video data for 5 minutes of video data leading up to the time a triggering event signal is received is included within the triggering event related video data and is redundantly stored across a plurality of storage devices.

At step 612, the triggering event related video data is stored by the video recording manager device 210. In some embodiments, the triggering event related video data is stored within a first storage medium 212 of the video recording manager device 210. In some embodiments, the stored triggering event related video data may comprise the composite authenticated video data 410 including authentication metadata 412 and one or more sets of individual video data 402.

In some embodiments, the triggering event related video data further comprises additional metadata relating to the triggering event. For example, the video data may be augmented with metadata including sensor data captured during the triggering event. In some embodiments, event related metadata may be included within frames of the video data. Accordingly, it may be possible to augment video frames with dynamic data. For example, location data or other sensor data may be continuously or periodically updated and recorded over time within the video frames. In some embodiments, it may be desirable to only augment certain frames of the video data with sensor data. For example, every tenth frame may be augmented or frames may be augmented once a second or once a minute. Further, in some embodiments, certain types of sensor data may be updated and augmented into video frames more frequently. For example, location data may be augmented into the video frames once a minute, while acceleration data may be augmented into the video data once a second.

At step 614, an additional copy of the triggering event related video data may be stored by the video recording manager device 210. In some embodiments, the additional copy may be stored in the second storage medium 214 of the video recording manager device 210. As described above, in some embodiments, the second storage medium 214 may be removable from the video recording manager device 210. In some embodiments, the additional copy of the triggering event related video data may be identical to the first triggering event related video data stored at step 612. Embodiments are contemplated in which the original triggering event related video data and the additional copy may be compared to ensure that neither version of the video data has been tampered with or altered. In some embodiments, it may be desirable to distribute copies of the video data between multiple different entities such that copies of the data from one entity may be compared to other copies to verify authenticity. Accordingly, embodiments are contemplated in which the triggering event related video data is compared to the additional copy to authenticate the triggering event related video data as evidence, for example, in a legal proceeding.

In some embodiments, redundant copies of the triggering event related video data further provide evidence capture assurance insuring against physical damage to any of the storage mediums. Embodiments of the invention provide further benefit because the triggering event related data may be stored across physically distributed storage media. For example, the one or more cameras 202 may be positioned in a separate location from the video recording manager device 210 such that if the video recording manager device 210 is damaged the video data is still available within the internal storage medium of the one or more cameras 202. Additionally, the second storage medium 214 of the video recording manager device 210 may be removable such that additional copies of the video data may be removed from the video recording manager device 210 and transported to another location.

At step 616, the triggering event related video data including the authentication metadata is transmitted to the cloud-based storage system 230. In some embodiments, the triggering event related video data may be transmitted upon completion of a triggering event recorded procedure after all of the triggering event related video data has been recorded. Alternatively, in some embodiments, the triggering event related video data may be transmitted to the cloud-based storage system 230 as it is received and as a suitable communication connection is available. For example, in some embodiments, the video recording manager device 210 may monitor the quality of a communication connection over a network to determine when the triggering event related video data should be transmitted. Further, embodiments are contemplated in which the triggering event related video data is transmitted after a certain amount of triggering event related video data has been recorded. For example, the triggering event related video data may be transmitted after 300 megabytes of data have been captured. It should be understood that, in some embodiments, the example of 300 megabytes given may be arbitrary and that other data amounts are also contemplated.

Transmitting the triggering event related video data to external storage systems such as the cloud-based storage system 230 provides further evidence capture assurance by persisting the video data remotely such that damage to any other storage media will not result in total loss of the video data, which in some cases, may include important video evidence. Further, embodiments are contemplated in which the video data may be published to online resources or the like to persist yet another copy of the video data distributed to various online databases.

In some embodiments, a video signature may be associated with the event-related video data that may be sent, for example, to cloud-based storage system 230 as soon as possible. In some embodiments, the video signature may comprise a unique identifier, hash, or checksum of the associated video data, which may be used to confirm that the video data has not been altered. In some embodiments, comparing video signatures may be much faster and less resource intensive than, for example, comparing the video data itself, as described above. In some embodiments, said video signature comprises a hash on the video data which ensures that the video data has not been altered after recording. In some such embodiments, the hash is generated for the video as soon as the video recording is closed. Said hash may be configured such that the hash will be altered, destroyed, or changed in some way if the video data is altered. In some embodiments, the hash may be included within the authentication metadata for the video data. In some embodiments, a cellular connection may be used to upload the hash and trigger information indicative of the triggering event within seconds of recording a video. In some embodiments, time stamps may be generated for various operations within the recording and storage process.

For example, a first time stamp may be generated for when the recording of a set of video data is closed and a second time stamp may be generated for when any combination of the hash, the trigger information, and the metadata arrives at a secure data storage, such as, for example, the cloud-based storage system 230. Accordingly, further assurance that the video has not been altered may be deduced from determining that there was not sufficient time to alter the video data between a time when recording ended to a time when the video data or its associated metadata or hash is stored within a secure data store. Further, if the hash of a set of video data matches the hash stored within the secure data store the set of video data is confirmed to be unaltered.

It should be understood that, in some embodiments, any number of the steps described herein with respect to method 600 may be performed simultaneously or in a different order than as explicitly described herein. Further, certain steps may be optional or removed entirely. For example, in some embodiments, the triggering event related video data may not be transmitted to the cloud-based storage system 230. Further still, certain steps of the method 600 may be repeated or may be performed continuously. For example, step 602 of recording video data may be performed continuously as other steps are performed.

In some embodiments, redundant copies of the triggering event related video data may be persisted until a confirmation is received that the triggering event related video data has been successfully received and stored at the cloud-based storage system 230. Here, overwriting or deletion of the triggering event related video data may be prevented until it is confirmed that the triggering event related video data has been stored elsewhere, such as on the cloud data store 232. For example, the cloud-based storage system 230 may receive the triggering event related video data and store the triggering event related video data within the cloud data store 232 before responding with a confirmation message or confirmation signal. In some embodiments, after receiving the confirmation message or confirmation signal the video recording manager device 210 may allow the redundant copies of the triggering event related video data to be deleted to make additional storage capacity available for subsequent triggering events.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A video recording authentication system for redundantly storing event related video data, the video recording authentication system comprising:
   one or more cameras configured to continuously record video data, wherein each of the one or more cameras includes an internal storage medium using a circular storage buffer for storing the video data;
   at least one sensor; and
   a video recording manager device communicatively coupled to the one or more cameras and the at least one sensor, the video recording manager device configured to transmit a triggering event signal to the one or more cameras based on a triggering event indication received from the at least one sensor, the video recording manager device comprising:
      a first storage medium storing triggering event related video data received from the one or more cameras, the triggering event related video data including at least a portion of the video data stored in the circular storage buffer recorded prior to receiving the triggering event indication and authentication metadata associated with the triggering event indication for authenticating the triggering event related video data;
      a second storage medium storing an additional copy of the triggering event related video data received from the one or more cameras, wherein the second storage medium is removable from the video recording manager device; and
      a wireless first transceiver configured to transmit the triggering event related video data including the authentication metadata over a wireless network to a cloud-based storage system,
   wherein the one or more cameras comprise a body-mounted camera mounted on a law enforcement officer, the body-mounted camera comprising a second wireless transceiver for communicating with the video recording manager device.

2. The video recording authentication system of claim 1, wherein each of the one or more cameras, the at least one sensor, and the video recording manager device are mounted within a law enforcement vehicle.

3. The video recording authentication system of claim 2, wherein the at least one sensor comprises a proximity tag reader.

4. The video recording authentication system of claim 3, wherein the authentication metadata is augmented to include proximity tag data indicative of an officer identifier associated with the law enforcement officer in proximity to the law enforcement vehicle.

5. The video recording authentication system of claim 1, wherein the at least one sensor comprises a GPS receiver and the authentication metadata further comprises location information.

6. The video recording authentication system of claim 1, wherein the internal storage medium of the one or more cameras comprises a partitioned storage including a first portion associated with the circular storage buffer and a second portion for storing the triggering event related video data.

7. A method for redundantly storing event related video data, the method comprising:
   continuously recording video data using one or more cameras;
   storing the video data from the one or more cameras within an internal storage medium of each respective camera, the internal storage medium comprising a circular storage buffer with a temporary first-in-first-out storage procedure operable to store up to 168 hours of the video data;
   receiving, via a video recording manager device, a triggering event indication from at least one sensor;
   responsive to receiving the triggering event indication, transmitting, via the video recording manager device, a triggering event signal to the one or more cameras, the triggering event signal initiating a triggering event recording procedure within each of the one or more cameras;
   receiving triggering event related video data from the one or more cameras into the video recording manager device, the triggering event related video data comprising at least a portion of the video data stored in the internal storage medium recorded prior to receiving the triggering event indication;

storing the triggering event related video data within a first storage medium of the video recording manager device along with authentication metadata associated with the triggering event indication for authenticating the triggering event related video data;

storing an additional copy of the triggering event related video data within a second storage medium of the video recording manager device along with the authentication metadata; and transmitting, from the video recording manager device, the triggering event related video data with the authentication metadata to a cloud-based storage system.

8. The method of claim 7, further comprising:
transmitting, from the video recording manager device, the authentication metadata to the one or more cameras to authenticate the video data stored in the internal storage medium of each respective camera.

9. The method of claim 7, further comprising:
preventing overwriting of the triggering event related video data on the internal storage medium of each of the one or more cameras before the triggering event related video data is stored by the cloud-based storage system.

10. The method of claim 9, further comprising:
receiving, at the video recording manager device, a confirmation message confirming storage of the triggering event related video data by the cloud-based storage system; and responsive to receiving the confirmation message, allowing the overwriting of the triggering event related video data from the internal storage medium of each of the one or more cameras.

11. The method of claim 7, further comprising:
comparing the triggering event related video data to the additional copy of the triggering event related video data to authenticate the triggering event related video data as evidence.

12. The method of claim 7, wherein the triggering event signal transmitted by the video recording manager device comprises an instruction to adjust a set of recording parameters of the one or more cameras based at least in part on a type of the triggering event indication.

13. The method of claim 12, wherein the set of recording parameters comprises a video resolution, a frame rate, and a shutter speed.

14. One or more non-transitory computer-readable media storing computer-executable instructions that, when executed by at least one processor, perform a method for redundantly storing event related video data, the method comprising:
continuously recording video data using one or more cameras;
storing the video data from the one or more cameras within an internal storage medium of each respective camera using a circular storage buffer, wherein the circular storage buffer comprises a temporary first-in-first-out storage procedure operable to store up to 168 hours of the video data;

receiving, via a video recording manager device, a triggering event indication from at least one sensor;

responsive to receiving the triggering event indication, transmitting, via the video recording manager device, a triggering event signal to the one or more cameras, the triggering event signal initiating a triggering event recording procedure within each of the one or more cameras;

receiving triggering event related video data from the one or more cameras into the video recording manager device, the triggering event related video data comprising at least a portion of the video data stored in the circular storage buffer recorded prior to receiving the triggering event indication;

storing the triggering event related video data within a first storage medium of the video recording manager device along with authentication metadata associated with the triggering event indication for authenticating the triggering event related video data; and storing an additional copy of the triggering event related video data within a second storage medium of the video recording manager device along with the authentication metadata.

15. The computer-readable media of claim 14, further comprising:
transmitting, from the video recording manager device, the triggering event related video data with the authentication metadata to a cloud-based storage system.

16. The computer-readable media of claim 14, further comprising:
responsive to the triggering event signal, transferring the one or more cameras from a standard continuous recording mode into a triggering event recording mode.

17. The computer-readable media of claim 16, wherein the triggering event recording mode is associated with an updated set of video recording parameters for increasing a video quality of the triggering event related video data compared to the standard continuous recording mode.

18. The computer-readable media of claim 17, wherein the standard continuous recording mode is associated with a first pixel resolution of 720p and the triggering event related video data is associated with a second pixel resolution selected from a set consisting of 1080p and 4K.

19. The computer-readable media of claim 14, wherein the at least one sensor comprises a proximity tag reader.

20. The computer-readable media of claim 19, wherein the authentication metadata is augmented to include proximity tag data indicative of an officer identifier associated with a law enforcement officer in proximity to a law enforcement vehicle.

* * * * *